US012196612B2

(12) United States Patent
Sobron et al.

(10) Patent No.: US 12,196,612 B2
(45) Date of Patent: Jan. 14, 2025

(54) METHOD AND SYSTEM FOR ADVANCED AUTOFOCUSING SPECTROSCOPY

(71) Applicant: Impossible Sensing LLC, St. Louis, MO (US)

(72) Inventors: Pablo Sobron, St. Louis, MO (US);
Christian Burlet, St. Louis, MO (US);
Evan Eshelman, St. Louis, MO (US);
Kirby Simon, St. Louis, MO (US);
Yves Vanbrabant, St. Louis, MO (US)

(73) Assignee: Impossible Sensing LLC, St. Louis, MO (US)

( * ) Notice: Subject to any disclaimer, the term of this patent is extended or adjusted under 35 U.S.C. 154(b) by 0 days.

(21) Appl. No.: 17/471,821

(22) Filed: Sep. 10, 2021

(65) Prior Publication Data
US 2022/0082435 A1    Mar. 17, 2022

Related U.S. Application Data

(60) Provisional application No. 63/077,228, filed on Sep. 11, 2020.

(51) Int. Cl.
*G01J 3/02*    (2006.01)
(52) U.S. Cl.
CPC .............. *G01J 3/0208* (2013.01); *G01J 3/021* (2013.01); *G01J 3/0237* (2013.01)
(58) Field of Classification Search
CPC ......... G01J 3/0208; G01J 3/021; G01J 3/0237
See application file for complete search history.

(56) References Cited

U.S. PATENT DOCUMENTS

2010/0118316 A1*   5/2010   Mihaylov ............... G02B 27/40
                                                              702/155
2013/0274923 A1*  10/2013   By ......................... G02B 27/62
                                                               901/47
(Continued)

FOREIGN PATENT DOCUMENTS

CN            111458860 A       7/2020
WO      WO-2019/084677 A1       5/2019

OTHER PUBLICATIONS

International Preliminary Report Application No. PCT/US2021/49758 mailed Mar. 7, 2023 , 8 pages.
(Continued)

*Primary Examiner* — Uzma Alam
*Assistant Examiner* — Huy Phillip Pham
(74) *Attorney, Agent, or Firm* — Goodwin Procter LLP

(57)    ABSTRACT

A spectroscopic autofocusing method and a system for such a method are disclosed. According to one embodiment, a spectroscopic autofocusing method includes applying a plurality of electrical signals to a shape changing lens of a spectroscopy system. The method includes emitting, by an optical source coupled to the spectroscopy system, one or more optical signals directed to a target. The method includes determining, by a detector, one or more power measurements of one or more returned optical signals corresponding to an illuminated area of the target. The method includes aggregating, from the detector, the one or more power measurements, wherein each power measurement corresponds to a respective electrical signal of the plurality of electrical signals applied to the shape changing lens. The method includes determining an optimized electrical signal corresponding to a maximum power measurement indicated by the one or more power measurements.

36 Claims, 9 Drawing Sheets

(56) References Cited

U.S. PATENT DOCUMENTS

2016/0202124 A1    7/2016  Lambert
2018/0299328 A1*  10/2018  Szybek ................ G01J 3/0208
2019/0195803 A1*   6/2019  Liu ........................ G01J 3/021

OTHER PUBLICATIONS

International Search Report of International Application No. PCT/US2021/49758 mailed Dec. 7, 2021, 9 pages.

* cited by examiner

101

METHOD AND SYSTEM FOR ADVANCED AUTOFOCUSING SPECTROSCOPY

CROSS-REFERENCE TO RELATED APPLICATION

This application claims the benefit of and priority to U.S. Provisional Application No. 63/077,228, filed on Sep. 11, 2020, entitled "METHOD AND SYSTEM FOR ADVANCED AUTOFOCUSING SPECTROSCOPY," which is hereby incorporated by reference in its entirety.

FIELD OF TECHNOLOGY

The present disclosure relates generally to spectroscopy technology and, more specifically, to autofocusing spectroscopy systems, and related methods and apparatus.

BACKGROUND

Spectroscopy is a study of the interaction of electromagnetic radiation with a matter or the emission of electromagnetic radiation in the electromagnetic spectrum. Conventional active and passive illumination (i.e. light) spectroscopy systems may include one or more optical assemblies (e.g., including lenses, optical filters, mirrors, etc.) that are used to measure an interaction of electromagnetic radiation with particular samples and objects. To measure samples and objects, spectroscopy systems may need to focus their optical assembly on their target to optimize a focal length for components within the optical assembly and a working distance with the optical assembly and the target, such that measurements of sufficient resolution may be observed and otherwise gathered. Some spectroscopy systems include capabilities to automatically focus (autofocus) their optical assemblies on targets for spectroscopic analysis. Conventional autofocus systems for spectroscopy systems may autofocus an optical assembly on a target, but they can suffer from requiring mechanical reconfiguration within the optical assembly to adjust to targets that require varying focal lengths. These positional changes associated with mechanical autofocus system can be time-consuming and complex processes, as they can require synchronous movement of components to allow for evaluation of the focus of the spectroscopy system. These positional changes also require movement of components within fixed dimensions to maintain practical focal lengths, which may not be practical or functional for smaller spectroscopy systems. Further, the mechanical components used to change the positions of optical components can degrade over time, reducing the lifespan of mechanical autofocus systems. Accordingly, spectroscopy systems may require improved autofocus systems that can enable adaptive autofocusing of an optical assembly without the deficiencies of mechanical autofocus techniques.

SUMMARY

Disclosed herein are autofocusing spectroscopy systems, and related methods and apparatus. According to one embodiment, a spectroscopic autofocusing method includes applying a plurality of electrical signals to a shape changing lens of a spectroscopy system. The method includes emitting, by an optical source coupled to the spectroscopy system, one or more optical signals directed to a target. The method includes determining, by a detector, one or more power measurements of one or more returned optical signals corresponding to an illuminated area of the target. The method includes aggregating, from the detector, the one or more power measurements, wherein each power measurement corresponds to a respective electrical signal of the plurality of electrical signals applied to the shape changing lens. The method includes determining an optimized electrical signal corresponding to a maximum power measurement indicated by the one or more power measurements.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1A:
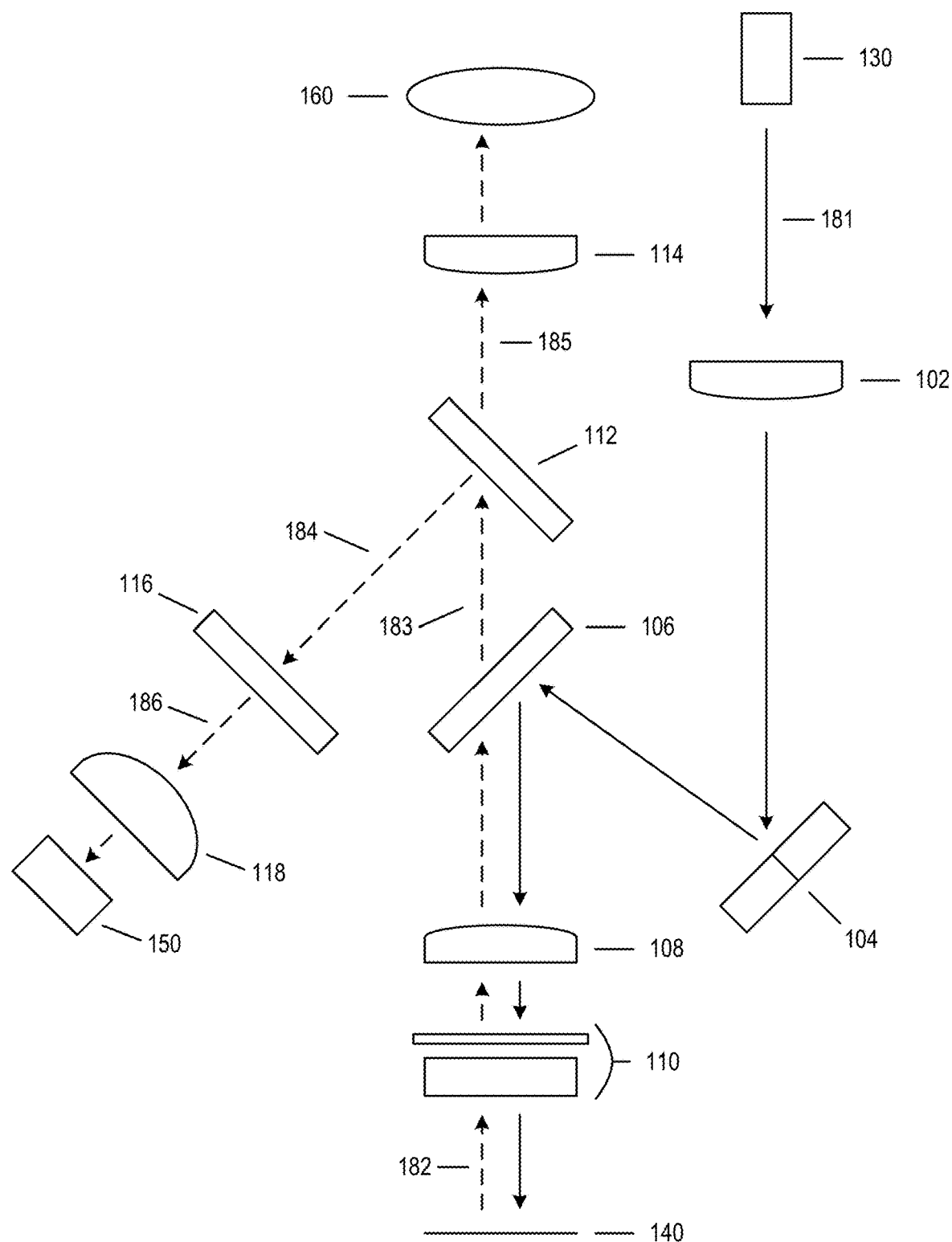
FIG. 1A shows an exemplary embodiment of architecture for an autofocusing spectroscopy system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

The present disclosure is directed to spectroscopy technology and, more specifically, autofocusing spectroscopy systems, and related methods and apparatus.

To overcome the deficiencies of conventional autofocus techniques used in spectroscopy systems, a spectroscopy system may include an improved autofocus system to form an autofocusing spectroscopy system that enables consistent, in-focus measurements of samples, without the movement of its optical components. The improved autofocus system may be applicable to all active and passive illumination spectroscopy systems that measure the interaction of electromagnetic radiation with a sample or the emission of electromagnetic radiation in the entire electromagnetic spectrum. In some embodiments, the autofocus system may be included as a part of any suitable optical assembly of a spectroscopy system. Some non-limiting examples of autofocusing optical assemblies may include those used (e.g., hand-held) by a human operator, integrated (e.g., attached) with a positioning system (e.g., robotic arm, boom, leg, conveyor belt), or wing, chassis, deck, underpan, wheel, in all marine (e.g., ocean, sea, lake, river, reservoir), underground (e.g., wellbores, caves, tunnels), airborne (e.g., drone, balloon, aircraft, stratospheric), surface (e.g., fields, farms, mines, industrial facilities), and space (e.g., orbital, planetary, and deep space) applications. Additional autofocusing optical assemblies may include those used as benchtop instrumentation (e.g., instrumentation used in academic, industrial, or national laboratories) and/or commercial instrumentation (e.g., instrumentation in the field or in a controlled industrial environment).

In some embodiments, an autofocusing spectroscopy system may enable spectroscopy measurements that are automatically focused based on a focal length of its optics relative to a target sample. The autofocusing spectroscopy system may be used in near-field applications (e.g., for measurements in the mm-cm range) and far-field applications (e.g., for measurements in the cm-km range). In some cases, the autofocusing spectroscopy system may include a shape-changing lens (e.g., variable focus (varifocus) lens, varifocus liquid lens, etc.). A shape-changing lens may enable continuous tuning of a focal length and working distance of the autofocusing spectroscopy system relative to a target (e.g., without the use of mechanical actuators and other mechanisms to change the position of optical components). The autofocusing spectroscopy system may control and/or otherwise optimize an optical configuration of the shape-changing lens to maintain a constant numerical aperture (and corresponding optical signal spot size) across a sample/surface under analysis as described below. In an example, a shape-changing lens (e.g., varifocus or varifocus liquid lens) may be used in each of the autofocusing spectroscopy systems described herein, such that a focal length (and corresponding working distance) of each system can be automatically configured relative to a target.

Embodiments of Spectroscopy System Architecture

Figure 1B:
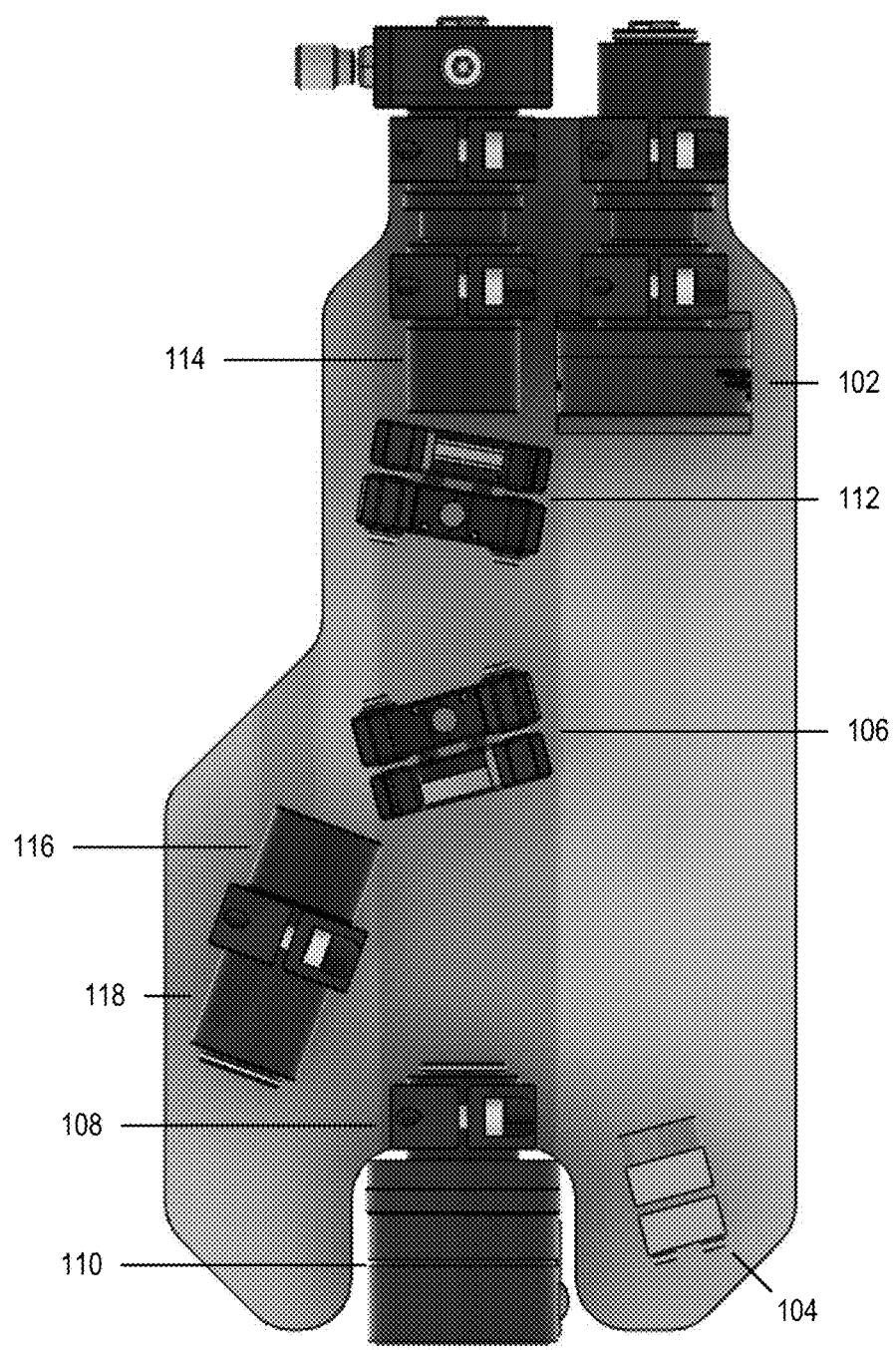
FIG. 1B shows a front view of an exemplary embodiment of an autofocusing spectroscopy system, in accordance with some embodiments.
Figure 1C:
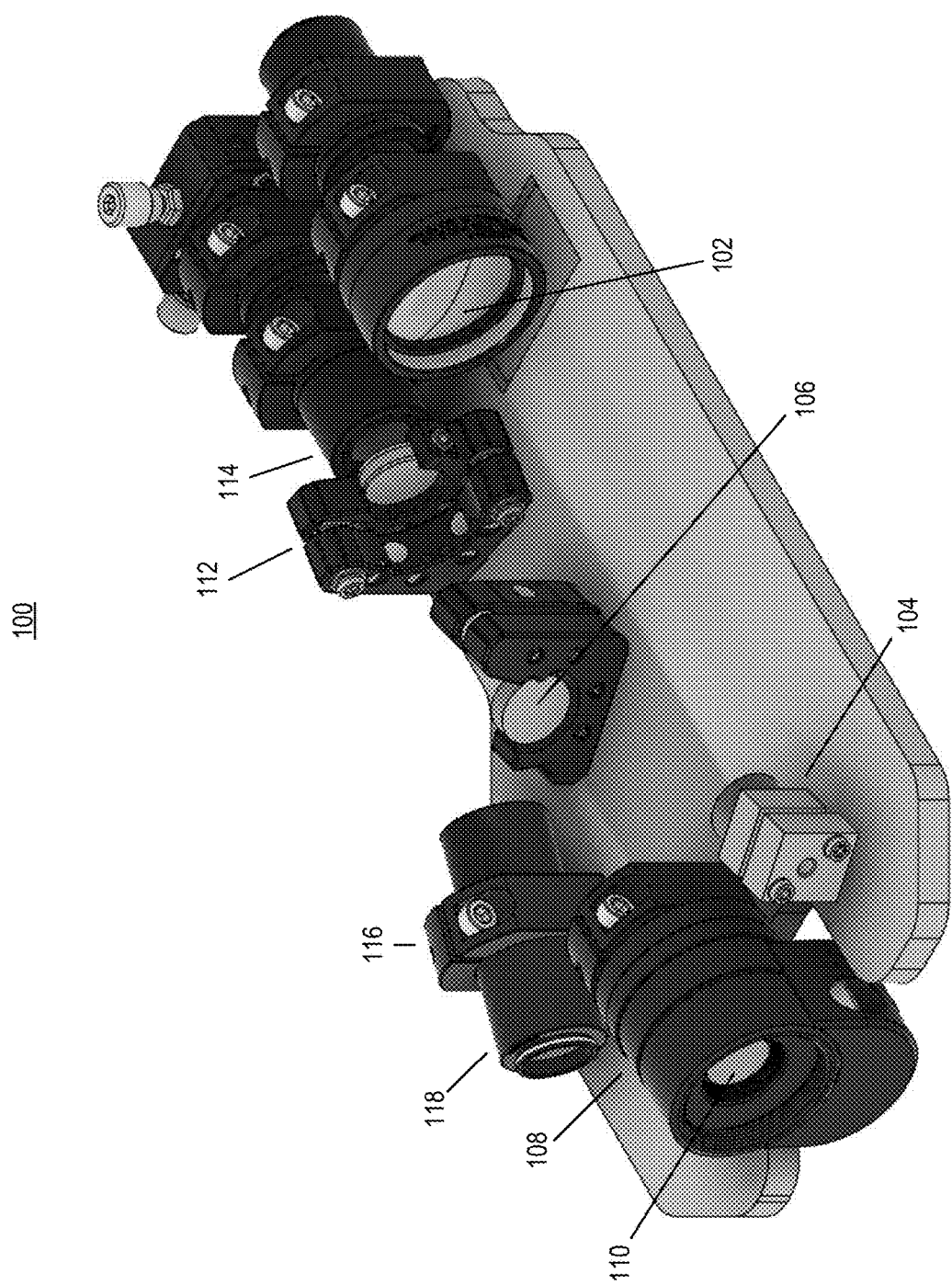
FIG. 1C shows a side view of an exemplary embodiment of an autofocusing spectroscopy system, in accordance with some embodiments.
Figure 2A:
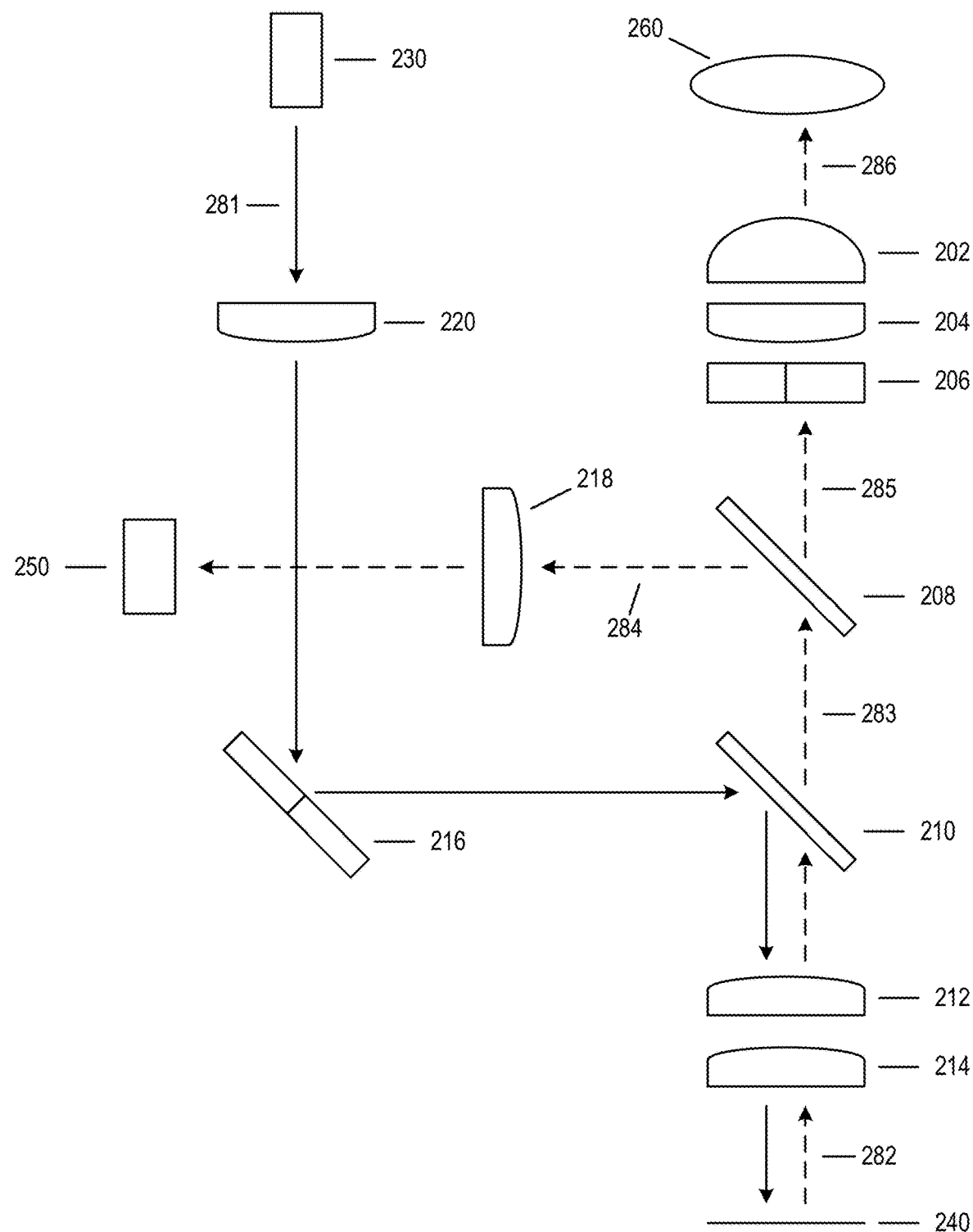
FIG. 2A shows an exemplary embodiment of architecture for an autofocusing spectroscopy system, in accordance with some embodiments.
Figure 2B:
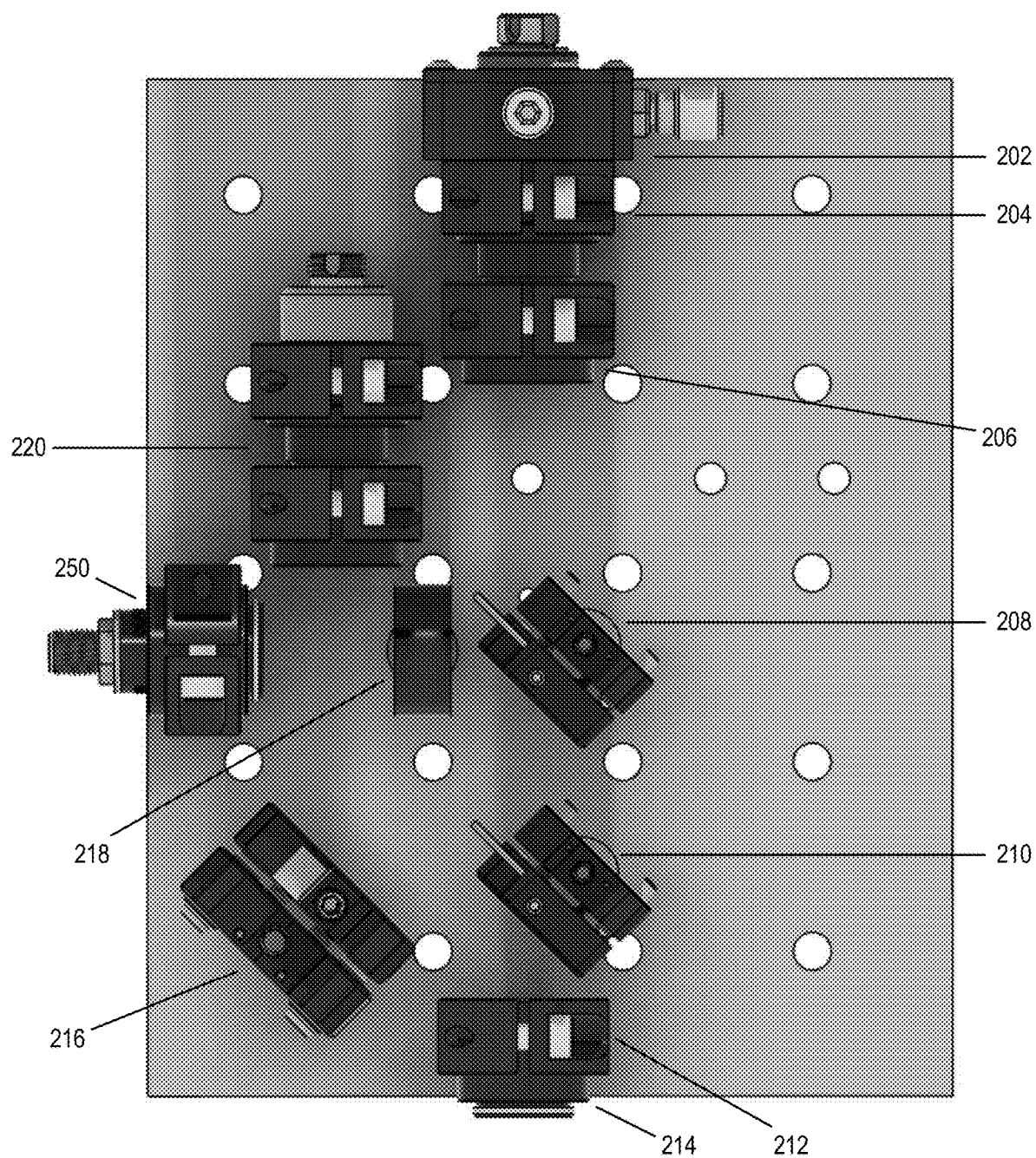
FIG. 2B shows an exemplary embodiment of an autofocusing spectroscopy system, in accordance with some embodiments.
Figure 3A:
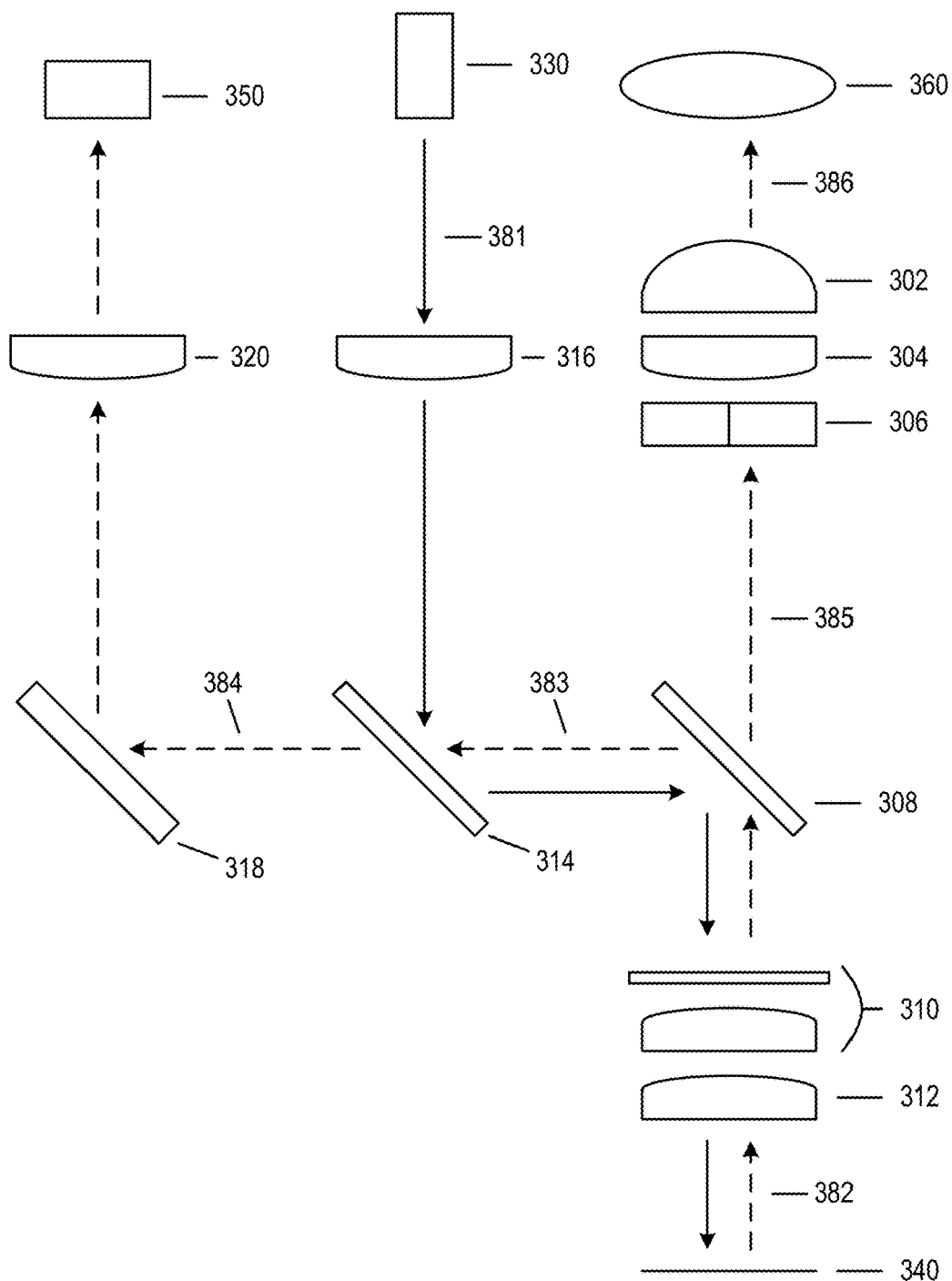
FIG. 3A shows an exemplary embodiment of architecture for an autofocusing spectroscopy system, in accordance with some embodiments.
Figure 3B:
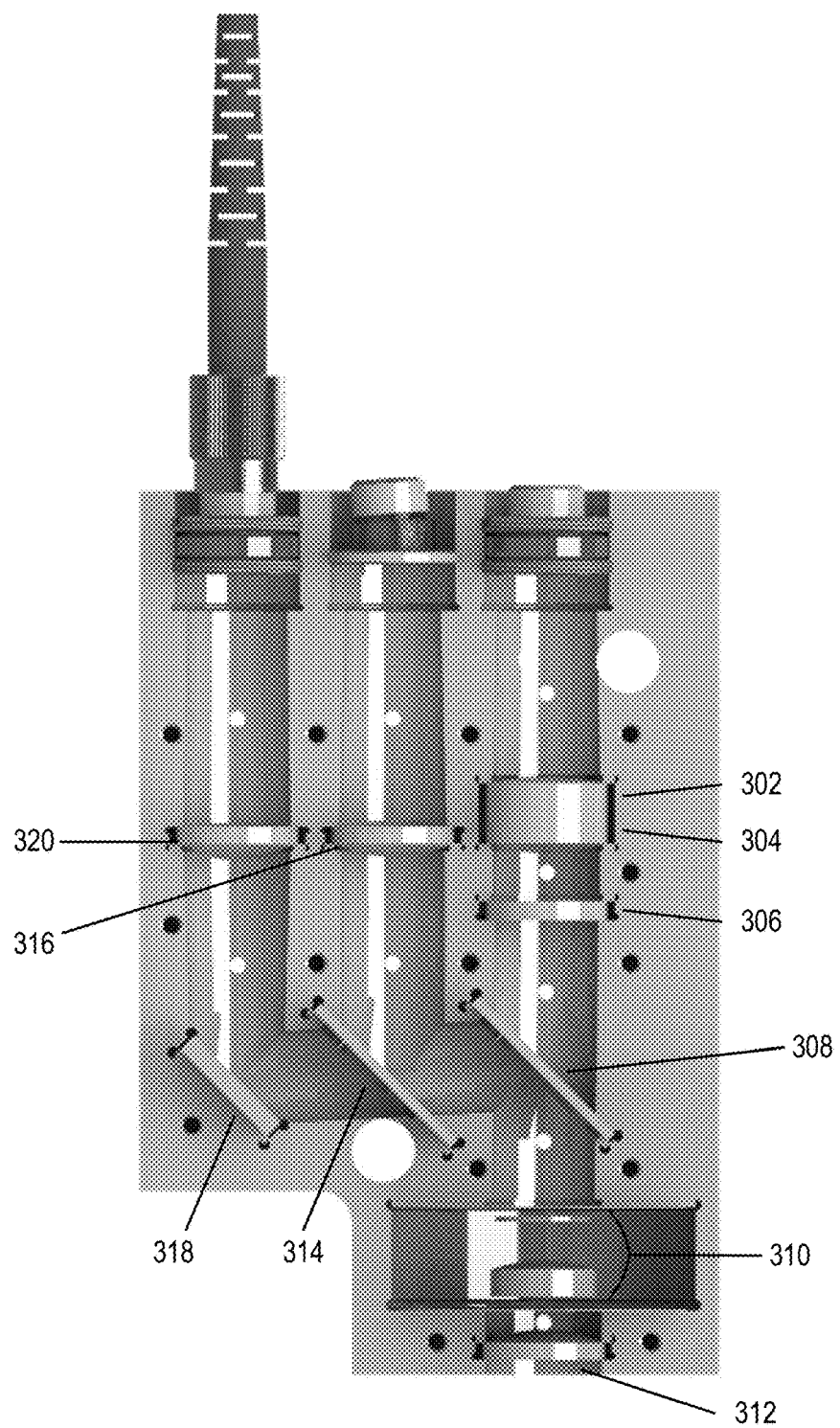
FIG. 3B shows an exemplary embodiment of an autofocusing spectroscopy system, in accordance with some embodiments.

FIG. 1A shows an exemplary embodiment of architecture 101 for an autofocusing spectroscopy system, in accordance with some embodiments. Exemplary optical coupling (e.g., ray tracing) between components of the configured architecture 101 of an autofocusing spectroscopy system is shown in FIG. 1A in solid, dashed, and dotted lines. The exemplary optical coupling shown by the solid, dashed, and dotted lines can be indicative of an optical path of an input optical signal (e.g., from an optical source) and one or more returned optical signals. FIGS. 1B and 1C show front and side views of an exemplary embodiment of an autofocusing spectroscopy system 100 configured with the architecture 101, in accordance with some embodiments. FIGS. 2A and 3A show exemplary embodiments of architectures 201 and 301 respectively for an autofocusing spectroscopy system, in accordance with some embodiments. Exemplary optical couplings (e.g., ray tracing) between components of the configured architectures 201 and 301 of an autofocusing spectroscopy system are shown in FIGS. 2A and 3A respectively in solid, dashed, and dotted lines. FIGS. 2B and 3B show exemplary embodiments of an autofocusing spectroscopy systems 200 and 300 configured with the architectures 201 and 301 respectively, in accordance with some embodiments.

In some embodiments, exemplary architectures (101, 201, 301) of an autofocusing spectroscopy system may use an optical feedback loop to autofocus their respective optics on a target. In some cases, an architecture (101, 201, 301) may include and/or be coupled to an optical source (e.g., a laser), which may emit an optical signal. The optical source may be coupled to the autofocusing spectroscopy system such that the emitted optical signal propagates through the autofocusing spectroscopy system to a target. In some cases, one or more returned optical signals may be emitted, scattered, and/or luminesced from the target. The optical signal may be collected and measured by the autofocusing spectroscopy system (or an external system). In some cases, an architecture (101, 201, 301) may include and/or be coupled to a photodiode, where the photodiode can operate as a part of an optical feedback loop to optically autofocus the respective system on a sample or surface. The photodiode may be sensitive to electromagnetic radiation included in one or more ranges of the electromagnetic spectrum. In an example, the photodiode may be sensitive to electromagnetic radiation (e.g., optical signals) in the deep ultraviolet to near infrared (approximately 150-1700 nm) spectrum. The photodiode may be configured with any suitable bandwidth to detect one or more optical signals. In an example, the bandwidth of the photodiode may be 5 GHz. The photodiode may be configured to measure optical feedback (e.g., optical signal(s) emitted, scattered, and/or luminesced from a target of the autofocusing spectroscopy system) as described herein, which can be used to autofocus an autofocusing spectroscopy system's optics on the target. To autofocus the respective spectroscopy system, the photodiode may be configured to measure optical signal power as a function of the configuration (e.g., focal length and working distance) of optics of the respective architecture (101, 201, 301), where the optical signal power corresponds to returned optical signal(s) originating from the target as described herein. As the focal length (and corresponding working distance) of the autofocusing spectroscopy system is changed to focus on a target, the photodiode may measure the corresponding optical signal power. A maximum optical signal power measured by the photodiode may correspond to an in focus configuration of the autofocusing spectroscopy system, such that the focal length of the autofocusing spectroscopy system is optimized relative to the system's target. The autofocusing spectroscopy system may be optimized for spectroscopy measurements of a target (e.g., samples and surfaces) when the system is configured in an in focus configuration.

In some cases, the architectures (101, 201, 301) as shown in FIGS. 1A, 2A, and 3A may use one or more additional/alternative methods and/or configurations to collect and measure optical feedback to autofocus their respective optics. In some cases, an architecture (101, 201, 301) may include and/or be coupled to a spectrometer (or other detector), where the spectrometer can operate as a part of an optical feedback loop to optically autofocus the respective system on a target. The spectrometer may measure optical feedback (e.g., optical signal(s) emitted, scattered, and/or luminesced from a target of the autofocusing spectroscopy system), which can be used to autofocus an autofocusing spectroscopy system's optics on the target. The spectrometer may measure optical feedback as the focal length (and working distance) of an autofocusing spectroscopy system is changed (e.g., by changing the current applied to a shape changing lens). The in focus configuration of the autofocusing spectroscopy system may be the configuration (e.g., focal length and working distance) that maximizes the optical signal power detected by the spectrometer as described herein. In some cases, the spectrometer may be used to measure returned optical signals originating from a target, such that the architectures (101, 201, 301) may be used for spectroscopic analysis of the target.

In some embodiments, an architecture (101, 201, 301) may include and/or be coupled to one or more cameras. In some cases, the camera(s) may be co-boresighted or off-axis camera(s). An example of a co-boresighted camera may be a Basler PowerPack Microscopy camera (5.0 or 2.0 MP, 2.2×2.2 µm pixel size). An example of an off-axis camera may be a Basler Ace acA3088-57uc camera (6 MP, 2.4×2.4 µm pixel size). The one or more cameras may be configured to image the target of an autofocusing spectroscopy system (and corresponding optical signal emitted by an optical source). As described herein, an optical source coupled to an autofocusing spectroscopy system may emit an optical signal, where the optical signal may propagate through the system, exit the system, and illuminate a target of the system. In some cases, an area on the target illuminated by the optical signal may be a spot, where a size of the spot corresponds to a focus of the system relative to the target. A spot may have a smaller area when the system is in focus relative to the target, while a spot may have a larger area when the system is out of focus relative to the target. In an example, the configuration (e.g., focal length and working distance) of the autofocusing spectroscopy system may be maximally in focus when the area of the spot is the smallest. As a spot size corresponding to the optical signal changes as a function of the focal length of the autofocusing spectroscopy system (e.g., by changing the shape of a shape changing lens), the one or more cameras may measure the spot size using software and/or image processing algorithms. An example of software used to measure spot size may include ImageJ. Examples of image processing algorithms used to measure spot size may include pattern recognition, particle tracking, and edge detection.

In some embodiments, the one or more cameras may be used to image the target subject to spectroscopy measurements from the autofocusing spectroscopy system. The one or more cameras may image the target as the focal length of the autofocusing spectroscopy system is changed (e.g., by changing the shape/curvature of a shape changing lens). In some cases, a single co-boresighted or off-axis camera may image the target. Imaging the target may include generating one or more images of the target. For example, a co-boresighted or off-axis camera may generate one or more images of a sample subject to spectroscopy measurements to autofocus the autofocusing spectroscopy system. Based on generating one or more images using the single co-boresighted or off-axis camera, one or more image processing algorithms may merge the one or more images into a combined image, where the combined image includes three dimensional (3D) topographical information (e.g., a topographical map) corresponding to the target. Examples of image processing algorithms used to generate the combined image may include z-stacking, z-projection, and focus stacking. In some cases, two or more co-boresighted and/or off-axis cameras may image the target. For example, two off-axis cameras may each generate one or more images of a sample subject to spectroscopy measurements to autofocus the autofocusing spectroscopy system. Based on generating one or more images using the two or more co-boresighted and/or off-axis cameras, one or more stereo vision algorithms may be used to generate a combined image, where the combined image includes 3D topographical information (e.g., a topographical map) corresponding to the target. Examples of stereo vision algorithms used to generate the combined image may include rectification, block matching, image stitching, and point-cloud generation. The combined image (e.g., generated using a single camera or two or more cameras) including the 3D topographical information may include (1) height information indicative of the height of the target surface; and (2) distance information indicative of the distance between the end of an optical pathway of the autofocusing spectroscopy system and a given point on a surface of target/sample. Using the height information and distance information in a feedback loop, the autofocusing spectroscopy system (or an external system) may determine an in focus configuration (e.g., a configuration of the shape changing lens) that optimizes the system's focal length (and working distance) relative to the target. The in focus configuration may optimize the system's spectroscopy measurement of the target based on an optimal working distance between the target and the system.

In some embodiments, autofocusing shape changing lenses included in the exemplary autofocusing spectroscopy systems and corresponding architectures described herein may include one or more characteristics. In some cases, the shape changing lenses (e.g., varifocus and varifocus liquid lenses) may have high transmission (e.g., 75-100% transmission) in the 400-2500 nm wavelength range. The shape changing lenses may include one or more coatings (e.g., broad band coatings), where each coating is configured to improve transmission of optical signals by the lenses in the visible (e.g., 420-950 nm) and/or the near-infrared (NIR) (e.g., 850-1500 nm) wavelength regions. Such coatings may improve the functionality of autofocusing spectroscopy systems in the visible and NIR wavelength ranges. In some cases, a shape changing lens may include one or more coatings that are configured to improve transmission in the ultraviolet (UV) wavelength (e.g., 190-420 nm) region, as well as enhance performance in the visible to NIR wavelength regions, such that the autofocusing spectroscopy systems and architecture described herein may be used with UV, visible, and/or NIR light spectroscopy techniques. Examples of UV spectroscopic techniques that may be used with the autofocusing spectroscopy systems described herein may include UV fluorescence, UV Raman, UV hyperspectral imaging. A shape changing lens configured for UV spectroscopy applications may include a UV-Grade Fused Silica window configured for high transmission in the 190-

1100 nm region. A shape changing lens may include an antireflective (AR) coating comparable to an Edmund Optics "UV-VIS [250-700 nm]" coating that improves the UV throughput of the lens. As an example, use of the one or more coatings in a shape changing lens may enhance the performance of laser-induced breakdown spectroscopy (LIBS) techniques in the autofocusing spectroscopy systems.

In some embodiments, as shown in FIG. 1A, an autofocusing spectroscopy system may include an architecture 101. The architecture 101 may include a lens 102. The lens 102 may be an aspheric lens. In an example, the lens may be a Thorlabs AL1225M-A aspheric lens. Any suitable lens may be used as the lens 102. In some cases, the architecture 101 may include a mirror 104, which may be optically coupled to the lens 102. In an example, the mirror 104 may be a Thorlabs PF05-03-P01 mirror. Any suitable mirror may be used as the mirror 104. In some cases, the architecture 101 may include a filter 106, which may be optically coupled to the mirror 104, a lens 108, and a filter 112. The filter 106 may be a long-pass edge filter, which may propagate optical signals having greater than a threshold wavelength and may not propagate (e.g., reflect or absorb) optical signals having less than a threshold wavelength. In an example, the filter 106 may be a Semrock FF01-515/LP edge filter. Any suitable filter may be used as the filter 106. In some cases, the architecture 101 may include a lens 108, which may be optically coupled to the filter 106 and a lens 110. The lens 108 may include an offset lens. In some cases, the lens 108 may include an achromatic doublet lens. In an example, the lens 108 may be a Thorlabs AC127-050-A offset lens. Any suitable lens may be used as the lens 108.

In some embodiments, the architecture 101 of the autofocusing spectroscopy system may include a lens 110, which may be optically coupled to the lens 108 as described herein. The lens 110 may be configured to optically couple to any sample, surface, or object observed and/or otherwise analyzed using the autofocusing spectroscopy system. The lens 110 may include a shape-changing (e.g., varifocus) lens. A shape (and corresponding focus) of the lens 110 may be configured using an electrical signal (e.g., current) applied to an input of the lens 110. In an example, the lens 110 may be an Optotune EL-10-30-C varifocus lens or an Optotune EL-10-30-Ci-VIS-LD varifocus lens. Any suitable shape-changing lens may be used as the lens 110. In some cases, the lens 110 may or may not include an optical window. If the lens 110 does not include an optical window, an optical window (not shown in FIG. 1A) may be coupled to the lens 110. The focal length (and corresponding working distance) of the architecture 101 may be configured based on the current applied to the lens 110. In some cases, the architecture 101 may include a filter 112, which may be optically coupled to the filter 106, a lens 114, and a filter 116. The filter 112 may be a long-pass edge filter, which may propagate optical signals having greater than a threshold wavelength and may not propagate (e.g., reflect) optical signals having less than a threshold wavelength. In some cases, the filter 112 may include one or more characteristics of the filter 106. For example, the filter 112 may be configured to propagate and not propagate (e.g., reflect) optical signals having the same wavelengths as the filter 106. In an example, the filter 112 may be a Semrock FF01-515/LP edge filter. Any suitable filter may be used as the filter 112. In some cases, the filters 106 and 112 may propagate a portion of optical signals that have less than a threshold wavelength. As an example, the filter 106 may propagate a portion of optical signals having less than a threshold wavelength, while the filter 112 may reflect the portion of the optical signals having less than the threshold wavelength.

In some embodiments, the architecture 101 may include a lens 114. The lens 114 may be an aspheric lens. In an example, the lens may be a Thorlabs AL1225M-A aspheric lens. Any suitable lens may be used as the lens 114. The lens 114 may be optically coupled to the filter 112. In some cases, the lens 114 may be optically coupled to a spectrometer 160 (or other suitable detector), such that the spectrometer 160 may measure the optical signals (e.g., returned optical signals) that propagate via the lens 114. In some cases, the architecture 101 may include a filter 116, which may be optically coupled to the filter 112 and a lens 118. The filter 116 may be a bandpass (i.e. notch) filter, such that the filter 116 allows optical signals having wavelengths within a particular range (i.e. band) to propagate through the filter 116. The filter 116 may not propagate (e.g., absorb or reflect) optical signals having wavelengths outside of the particular range. In an example, the filter 116 may be a Semrock FF01-514-3/25 filter. Any suitable filter may be used as the filter 116. In some cases, the architecture 101 may include a lens 118. The lens 118 may be optically coupled to the filter 116. In some cases, the lens 118 may be optically coupled to a photodiode 150 (or other suitable detector), where the detector includes one or more characteristics of a photodiode as described herein. The lens 118 may be configured to direct an optical signal (e.g., returned optical signal) on the photodiode 150. The lens 118 may be a plano convex lens. In an example, the lens 118 may be a Thorlabs LA1540-A lens. Any suitable lens may be used as the lens 118.

In some embodiments, the architecture 101 may be used in an autofocusing spectroscopy system to gather one or more spectroscopy measurements (e.g. laser spectroscopy measurements) of a target 140. The target 140 may be any surface, sample, or object that may be analyzed using spectroscopy. In some cases, for spectroscopy measurements, the architecture 101 may include and/or otherwise be coupled (e.g., removably coupled) to an optical source 130. In some cases, the optical source 130 may be a laser. In an example, the optical source 130 may emit one or more optical pulses of an approximately 515 nm wavelength. An optical source that can emit optical signals at any suitable wavelength may be used as the optical source 130. In an example, the optical source 130 may be a Flare NX laser. In some cases, the optical source 130 may be coupled to the architecture 101 using a fiber cable (or other optical cable) and a coupling mechanism (not shown in FIG. 1A), such that the optical source 130 is optically coupled to the lens 102. In some cases, the fiber cable may be a multimode fiber coupling. As an example, the multimode fiber coupling used with the architecture can be a 0.1 NA multimode 105 µm core fiber. The architecture 101 may include one or more connectors (e.g., fiber-optic connector/physical contact (FC/PC) connectors). In some cases, the architecture 101 may include and/or otherwise be coupled (e.g., removably coupled) to a photodiode 150. As an example, the photodiode 150 may be included as a part of the architecture 101. An example of an advantage for including the photodiode 150 in the architecture 101 (rather than locating the photodiode 150 external to the architecture 101) may include enabling the respective autofocusing spectroscopy system to function as a stand-alone device for autofocused spectroscopy measurements. The photodiode 150 may include one or more characteristics of the photodiode as described herein. If the photodiode 150 is external (e.g. removably coupled) to the architecture 101, the photodiode 150 may be optically coupled to the lens 118 (and corresponding architecture 101)

via a fiber cable (or other optical cable) and a coupling mechanism. In some cases, the architecture 101 may include and/or otherwise be coupled (e.g., removably coupled) to a spectrometer 160. If the spectrometer 160 is external (e.g., removably coupled) to the architecture 101, the spectrometer 160 may be coupled to the architecture 101 via a fiber cable (or other optical cable) and a coupling mechanism as described herein. The spectrometer 160 may include one or more characteristics of a spectrometer as described herein.

In some embodiments, for a laser spectroscopy application of the architecture 101 as shown in FIG. 1A, the optical source 130 may emit an optical signal 181 (e.g., pulsed laser light at 515 nm) as shown in solid lines. The optical signal 181 may propagate through the lens 102. The lens 102 may collimate the optical signal 181, allowing the optical signal 181 to propagate towards the mirror 104. The optical signal 181 may reflect from the mirror 104 towards the filter 106. The filter 106 may reflect the optical signal 181 towards the lens 108 based on the filter 106 being configured to reflect optical signal(s) that have the wavelength(s) of the optical signal 181 emitted by the optical source 130. The optical signal 181 reflected by the filter 106 may be co-boresighted with a collection pathway corresponding to optical signal(s) received by the photodiode 150 and/or the spectrometer 160 as described below.

In some embodiments, the optical signal 181 may propagate through the lens 108 towards the lens 110. As described herein, the lens 110 may be a shape changing (e.g., varifocus) lens, such that the focal length of the of the architecture 101 can be configured based on the configured shape of the lens 110. The optical signal 181 may propagate through the lens 110, such that the lens 110 focuses the optical signal 181 towards a target 140. The optical signal 181 may illuminate the target 140. Based on the properties of the target 140, an optical signal 182 may return from the target 140 as shown in dashed lines in FIG. 1A. The optical signal 182 may be emitted, scattered, and/or luminesced from the target 140. The optical signal 182 may propagate towards the lens 110. The optical signal 182 may propagate through the lens 110 towards the lens 108. The optical signal 182 may propagate through the lens 108 towards the filter 106. The filter 106 may filter light included in the optical signal 182 that has less than a threshold wavelength, such that filter 106 does not propagate an optical signal 182 having less than a threshold wavelength and/or propagates an optical signal 183 having greater than the threshold wavelength (if applicable to the optical signal 182). In some cases, the filter 106 may propagate a portion of the optical signal 182 having less than the threshold wavelength, where the portion of the optical signal 182 having less than the threshold wavelength is included in the optical signal 183. The optical signal 183 may propagate towards the filter 112. The filter 112 may filter light included in the optical signal 183 that has less than a threshold wavelength, such that filter 112 reflects an optical signal 184 having less than a threshold wavelength and/or propagates an optical signal 185 having greater than the threshold wavelength (if applicable to the optical signal 183). In an example, the filter 112 may reflect Rayleigh scattering light originating from the optical signal 181 (e.g., having less than the threshold wavelength) interacting with the target 140, while propagating other scattering light (e.g., having greater than the threshold wavelength). A configuration of the filter 106 and the filter 112 may determine whether the architecture is suitable for Raman spectroscopy applications and/or for LIBS applications. As an example, for Raman spectroscopy applications, the filter 112 may be configured as an edge filter such that the filter 112 reflects the optical signal 181 wavelength, but propagates wavelengths (e.g., Raman wavelengths) that are longer than the optical signal 181 wavelength. As another example, for LIBS applications, the filter 112 may be configured as a notch filter or a dichroic notch filter such that the filter 112 does not propagate the optical signal 181 wavelength, but propagates wavelengths that are longer and/or shorter than the optical signal 181 wavelength.

In some embodiments, if the filter 112 reflects an optical signal 184, the filter 112 may reflect the optical signal 184 towards a filter 116. The filter 116 may filter light included in the optical signal 184 based on a range (i.e. band) of wavelengths, such that the filter 116 does not propagate (e.g., absorbs or reflects) optical signals having wavelengths outside of the range and/or propagates an optical signal 186 having wavelength(s) inside the range. The filter 116 may propagate an optical signal 186 towards a lens 118. The lens 118 may propagate the optical signal 186 towards the photodiode 150. In some cases, the lens 118 and the photodiode 150 may be separated by a divider, where the barrier includes a pinhole. The optical signal 186 may propagate through the pinhole to the photodiode 150. In some cases, as described herein, the photodiode 150 may be included in the architecture 101 of an autofocusing spectroscopy system. In other cases, the photodiode 150 may be externally coupled (e.g., removably coupled) to the architecture 101 of an autofocusing spectroscopy system. The photodiode 150 may receive and/or otherwise measure the optical signal 186. In some cases, measurements of the power of the optical signal 186 collected by the photodiode 150 may be used to determine and configure a focus of an autofocusing spectroscopy system relative to the target 140. As described herein, for a range of configured focal lengths for the architecture 101 (e.g., as configured based on a current applied to the lens 110), the focal length (and corresponding working distance) resulting in the maximum power measured by the photodiode 150 may be the in focus configuration of the architecture 101 and the associated autofocusing spectroscopy system.

In some embodiments, if the filter 112 propagates an optical signal 185, the optical signal 185 may be directed towards a lens 114. The optical signal may propagate through the lens 114 towards a spectrometer 160. In some cases, the spectrometer 160 may be included in the architecture 101 of an autofocusing spectroscopy system. In other cases, the spectrometer 160 may be externally coupled (e.g., removably coupled) to the architecture 101 of an autofocusing spectroscopy system. The spectrometer 160 may receive and/or otherwise measure the optical signal 185. In some cases, measurements of the power of the optical signal 185 collected by the spectrometer 160 may be used to determine and configure a focus of an autofocusing spectroscopy system relative to the target 140. As described herein, for a range of configured focal lengths for the architecture 101 (e.g., as configured based on a current applied to the lens 110), the focal length (and corresponding working distance) resulting in the maximum power measured by the spectrometer 160 may be the in focus configuration of the architecture 101 and the associated autofocusing spectroscopy system. In some cases, the spectrometer 160 may collect the optical signal 185 for spectroscopic analysis of the target 140.

As shown in FIG. 1B, an exemplary autofocusing spectroscopy system 100 may include one or more components of the architecture 101 as described herein with respect to FIG. 1A. As shown in FIG. 1C, the exemplary autofocusing spectroscopy system 100 may include one or more components of the architecture 101 as described herein with respect to FIG. 1A. The autofocusing spectroscopy system 100 as shown in FIGS. 1B and 1C may be used for spectroscopic applications when coupled to an optical source 130, photodiode 150, and a spectrometer 160. As an example, the autofocusing spectroscopy system 100 may be used as a Raman probe, such that the system 100 can be used for Raman spectroscopy applications (e.g., chemical analysis of material(s) corresponding to a target). As another example, the autofocusing spectroscopy system 100 as shown in FIGS. 1B and 1C may be used as a probe for LIBS applications based on a configuration of the filters 106 and 112. For example, the filters 106 and 112 may be configured as notch filters, such that the filters 106 and 112 do not propagate (e.g., reflect) optical signals having wavelengths corresponding to the optical signal 181, while propagating optical signals having wavelengths that are longer and/or shorter than the wavelengths corresponding to the optical signal 181.

In some embodiments, as shown in FIG. 2A, an autofocusing spectroscopy system may include an architecture 201. The architecture 201 may include a lens 202. The lens may be optically coupled to a lens 204 and/or a spectrometer 260 (or other suitable detector). The spectrometer 260 may include one or more characteristics of a spectrometer as described herein. The lens 202 may be a meniscus lens (e.g., calcium fluoride negative meniscus lens). In an example, the lens 202 may be a Thorlabs LF5154-A calcium fluoride negative meniscus lens. Any suitable lens may be used as the lens 202. In some cases, the architecture 201 may include a lens 204, which may be optically coupled to the lens 202 and filter 206. The lens 204 may be a bi-convex lens. In an example, the lens 204 may be a Thorlabs LB1450-A bi-convex lens. Any suitable lens may be used as the lens 204. In some cases, the architecture 201 may include a filter 206, which may be optically coupled to the lens 204 and a filter 208. The filter 206 may be a long-pass edge filter, which may propagate optical signals having greater than a threshold wavelength and may not propagate (e.g., absorb or reflect) optical signals having less than a threshold wavelength. In an example, the filter 206 may be a Semrock LP02-514RE-12.7-D long-pass edge filter. Any suitable filter may be used as the filter 206. In some cases, the architecture 201 may include a filter 208, which may be optically coupled to the filter 206, a filter 210, and a lens 218. The filter 208 may be a long-pass filter (e.g., a dichroic long-pass filter), which may propagate optical signals having greater than a threshold wavelength and may not propagate (e.g., reflect) optical signals having less than a threshold wavelength. In an example, the filter 208 may be a Semrock Di03-R514-t1-12.7-D dichroic long-pass filter. Any suitable filter may be used as the filter 208. In some cases, the architecture 201 may include a filter 210, which may be optically coupled to the filter 208, a lens 212, and/or a mirror 216. The filter 210 may be a long-pass filter (e.g., a dichroic long-pass filter), which may propagate optical signals having greater than a threshold wavelength and may not propagate (e.g. reflect) optical signals having less than a threshold wavelength. In some cases, filter 210 may propagate a portion of optical signals having less than the threshold wavelength, which may be subsequently reflected by the filter 208. In an example, the filter 210 may be a Semrock Di03-R514-t1-12.7-D dichroic long-pass filter. Any suitable filter may be used as the filter 210. The filter 210 may include one or more characteristics of the filter 208. For example, the filters 208 and 210 may be the same filter.

In some embodiments, the architecture 201 of the autofocusing spectroscopy system may include a lens 212, which may be optically coupled to the filter 210, and/or a lens 214. The lens 212 may be a shape-changing (e.g., varifocus or liquid varifocus) lens. A shape (and corresponding focus) of the lens 212 may be configured using an electrical signal (e.g., current) applied to an input of the lens 212. In an example, the lens 212 may be a Corning A-58N varifocus liquid lens. Any suitable shape-changing lens may be used as the lens 212. The focal length (and corresponding working distance) of the architecture 201 may be configured based on the current applied to the lens 212. In some cases, the architecture 201 may include a lens 214, which may be optically coupled to the lens 212 and any suitable target (e.g., a target 240). The lens 214 may be configured to optically couple to any sample, surface, or object observed and/or otherwise analyzed using the autofocusing spectroscopy system. The lens 214 may be a plano convex lens configured to direct an optical signal on a target 240 of an autofocusing spectroscopy system configured with the architecture 201. In an example, the lens 214 may be a Thorlabs LA1289-A plano convex lens. Any suitable lens may be used as the lens 214. In some cases, the lens 214 may be configured to direct an optical signal (e.g., returned optical signal) returned from the target 240 onto the lens 212.

In some embodiments, the architecture 201 may include a mirror 216. The mirror 216 may be optically coupled to the filter 210 and a lens 220. In an example, the mirror may be an Edmund Optics 84-439 mirror. Any suitable mirror may be used as the mirror 216. In some cases, the architecture 201 may include a lens 220. The lens 220 may be optically coupled to the mirror 216. In some cases, the lens 220 may be optically coupled to an optical source 230, where the optical source 230 includes one or more characteristics of the optical source 130 as described herein with respect to FIG. 1A. The architecture 201 may include and/or otherwise be coupled (e.g., removably coupled) to the optical source 230. The lens 220 may be configured to direct a received optical signal from the optical source 230 onto the mirror 216. The lens 220 may be a plano convex lens. In an example, the lens 220 may be a Thorlabs LA1289-A lens. Any suitable lens may be used as the lens 220. In some cases, the architecture 201 may include a lens 218, which may be optically coupled to the filter 208. The lens 218 may be a plano convex lens. In an example, the lens 218 may be a Thorlabs LA1289-A plano convex lens. Any suitable lens may be used as the lens 218. In some cases, the lens 218 may be optically coupled to a photodiode 250, where the photodiode 250 includes one or more characteristics of a photodiode as described herein.

In some embodiments, the architecture 201 may be used in an autofocusing spectroscopy system to gather one or more spectroscopy measurements (e.g. laser spectroscopy measurements) of a target 240. The target 240 may be any surface, sample, or object that may be analyzed using spectroscopy (e.g., as described with respect FIG. 1A). In some cases, for spectroscopy measurements, the architecture 201 may include and/or otherwise be coupled to an optical source 230. The optical source 230 may include one or more characteristics of the optical source 130 and may be coupled to the architecture 201 by a fiber cable and coupling mechanism as described herein. In some cases, the architecture 201 may include and/or otherwise be coupled to a photodiode 250. As an example, the photodiode 250 may be included as a part of the architecture 201. If the photodiode 250 is external to the architecture 201, the photodiode 250 may be optically coupled to the lens 218 (and corresponding architecture 201) via a fiber cable (or other optical cable) and a coupling mechanism as described herein. The photodiode 250 may include one or more characteristics of the photodiode as described herein. In some cases, the architecture 201 may include and/or otherwise be coupled to a spectrometer 260. If the spectrometer 260 is external the to the architecture 201, the spectrometer 260 may be optically coupled to the lens 202 (and corresponding architecture 201) via a fiber cable (or other optical cable) and a coupling mechanism as described herein. The spectrometer 260 may include one or more characteristics of a spectrometer as described herein.

In some embodiments, for a laser spectroscopy application of the architecture 201 as shown in FIG. 2A, the optical source 230 may emit an optical signal 281 (e.g., pulsed or continuous laser light between 200-1100 nm) as shown in solid lines. As an example, the optical signal 281 may be pulsed or continuous light at 515 nm, 532 nm, 633 nm, 785 nm, or any other suitable wavelength(s). The optical signal 281 may propagate through the lens 220 towards the mirror 216. The lens 220 may collimate the optical signal 281, allowing the optical signal 281 to propagate towards the mirror 216. The mirror 216 may reflect the optical signal 281 towards the filter 210. The filter 210 may reflect the optical signal 281 towards the lens 212 based on the filter 210 being configured to reflect optical signal(s) that have the wavelength(s) of the optical signal 181 emitted by the optical source 230. The optical signal 281 reflected by the filter 210 may be co-boresighted with a collection pathway corresponding to optical signal(s) received by the photodiode 250 and/or the spectrometer 260 as described below.

In some embodiments, the optical signal 281 may reflect from the filter 210 towards the lens 212. As described herein, the lens 212 may be a shape changing (e.g., varifocus liquid) lens, such that the focal length of the of the architecture 201 can be configured based on the configured shape of the lens 212. The optical signal 281 may propagate through the lens 212, such that the lens 212 focuses the optical signal 281 towards the lens 214. The optical signal 281 may propagate through the lens 214, such that the lens 214 focuses the optical signal 281 on a target 240. The optical signal 281 may illuminate the target 240. Based on the properties of the target 240, an optical signal 282 may return from the target 240 as shown in dashed lines in FIG. 2A. The optical signal 282 may be emitted, scattered, and/or luminesced from the target 240. The optical signal 282 may propagate towards the lens 214. The optical signal 282 may propagate through the lens 214 towards the lens 212. The optical signal 282 may propagate through the lens 212 towards the filter 210. The filter 210 may filter light included in the optical signal 282 that has less than a threshold wavelength, such that filter 210 does not propagate an optical signal having less than a threshold wavelength and/or propagates an optical signal 283 having greater than the threshold wavelength (if applicable to the optical signal 282). In some cases, the filter 210 may propagate a portion of the optical signal 282 having less than the threshold wavelength, where the portion of the optical signal 282 having less than the threshold wavelength is included in the optical signal 283. The optical signal 283 may propagate towards the filter 208.

In some embodiments, the optical signal 283 may propagate through the filter 210 towards the filter 208. The filter 208 may filter light included in the optical signal 283 that has less than a threshold wavelength, such that filter 208 does not propagate (e.g., reflect) an optical signal 284 having less than a threshold wavelength and/or propagates an optical signal 285 having greater than the threshold wavelength (if applicable to the optical signal 283). In an example, the filter 208 may reflect Rayleigh scattering light originating from the optical signal 281 (e.g., having less than the threshold wavelength) interacting with the target 240, while propagating other light (e.g., having greater than the threshold wavelength). The Rayleigh scattering light may be measured by the photodiode 250 (for autofocusing of the architecture 201), while the other light may be measured by the spectrometer 260 for spectral analysis (and/or for autofocusing of the architecture 201).

In some embodiments, if the filter 208 reflects an optical signal 284, the filter 208 may reflect the optical signal 284 towards the lens 218. The lens 218 may propagate the optical signal 284 towards the photodiode 250. In some cases, the lens 218 and the photodiode 250 may be separated by a divider, where the barrier includes a pinhole. The optical signal 284 may propagate through the pinhole to the photodiode 250. In some cases, the photodiode 250 may be included in the architecture 201 of an autofocusing spectroscopy system. In other cases, the photodiode 250 may be externally coupled (e.g., removably coupled) to the architecture 201 of an autofocusing spectroscopy system. If the photodiode 250 is external to the architecture 201, the photodiode 250 may be optically coupled to the lens 218 via a fiber cable (or other optical cable) and a coupling mechanism (not shown in FIG. 2A). The photodiode 250 may receive and/or otherwise measure the optical signal 284. In some cases, measurements of the power of the optical signal 284 collected by the photodiode 250 may be used to determine and configure a focus of an autofocusing spectroscopy system relative to the target 240. As described herein, for a range of configured focal lengths for the architecture 201 (e.g., as configured based on a current applied to the lens 212), the focal length (and corresponding working distance) resulting in the maximum power measured by the photodiode 250 may be the in focus configuration of the architecture 201 and the associated autofocusing spectroscopy system.

In some embodiments, if the filter 208 propagates an optical signal 285, the optical signal 285 may be directed towards the filter 206. The filter 206 may filter light included in the optical signal 285 that has less than a threshold wavelength, such that filter 206 does not propagate (e.g., absorbs or reflects) an optical signal having less than a threshold wavelength and/or propagates an optical signal 286 having greater than the threshold wavelength (if applicable to the optical signal 285). The optical signal 286 may propagate through the filter 206 towards the lens 204. The optical signal 286 may propagate through the lens 204 towards the lens 202. The optical signal may propagate through the lens 202 towards a spectrometer 260. In some cases, the spectrometer 260 may be included in the architecture 201 of an autofocusing spectroscopy system. In other cases, the spectrometer 260 may be externally coupled (e.g., removably coupled) to the architecture 201 of an autofocusing spectroscopy system. If the spectrometer 260 is external to the architecture 201, the spectrometer 260 may be optically coupled to the lens 202 via a fiber cable (or other optical cable) and a coupling mechanism (not shown in FIG. 2A). The spectrometer 260 may receive and/or otherwise measure the optical signal 286. In some cases, measurements of the power of the optical signal 286 collected by the spectrometer 260 may be used to determine and configure a focus of an autofocusing spectroscopy system relative to the target 240. As described herein, for a range of configured focal lengths for the architecture 201 (e.g., as configured based on a current applied to the lens 212), the focal length (and corresponding working distance) resulting in the maximum power measured by the spectrometer 260 may be the in focus configuration of the architecture 201 and the associated autofocusing spectroscopy system.

As shown in FIG. 2B, an exemplary autofocusing spectroscopy system 200 may include one or more components of the architecture 201 as described herein with respect to FIG. 2A. The autofocusing spectroscopy system 200 as shown in FIG. 2B may be used for spectroscopic applications when coupled to an optical source 230 and a spectrometer 260. As an example, the autofocusing spectroscopy system 200 may be used as a Raman probe, such that the system 200 can be used for Raman applications (e.g., chemical analysis of material(s) corresponding to a target). The autofocusing spectroscopy system 200 as shown in FIG. 2B may be used as a probe for LIBS applications based on a configuration of the filters 206, 208, and 210. For example, the filters 206, 208, and 210 may be configured as notch filters or dichroic notch filters, such that the filters 206, 208, and 210 do not propagate (e.g., reflect) optical signals having wavelengths corresponding to the optical signal 281, while propagating optical signals having wavelengths that are longer and/or shorter than the wavelengths corresponding to the optical signal 281.

In some embodiments, as shown in FIG. 3A, an autofocusing spectroscopy system may include an architecture 301. The architecture 301 may include a lens 302. The lens 302 may be a meniscus lens (e.g., calcium fluoride negative meniscus lens). In an example, the lens 302 may be a Thorlabs LF5154-A calcium fluoride negative meniscus lens. Any suitable lens may be used as the lens 302. The lens 302 may be optically coupled to a lens 304 and a spectrometer 360 (or another detector). In some cases, the architecture 301 may include a lens 304, which may be optically coupled to the lens 302 and a filter 306. The lens 304 may be a bi-convex lens. In an example, the lens 304 may be a Thorlabs LB1450-A bi-convex lens. Any suitable lens may be used as the lens 304. In some cases, the architecture 301 may include a filter 306, which may be optically coupled to the lens 304 and a filter 308. The filter 306 may be a long-pass edge filter, which may propagate optical signals having greater than a threshold wavelength and may not propagate (e.g., absorb or reflect) optical signals having less than a threshold wavelength. In an example, the filter 306 may be a Semrock LP02-514RE-12.7-D long-pass edge filter. Any suitable filter may be used as the filter 306. In some cases, the architecture 301 may include a filter 308, which may be optically coupled to the filter 306, a lens 310, and a filter 314. The filter 308 may be a long-pass filter (e.g., a dichroic long-pass filter), which may propagate optical signals having greater than a threshold wavelength and may not propagate (e.g., reflect) optical signals having less than a threshold wavelength. In an example, the filter 308 may be a Semrock Di02-R514 dichroic long-pass filter. Any suitable filter may be used as the filter 308.

In some embodiments, the architecture 301 of the autofocusing spectroscopy system may include a lens 310, which may be optically coupled to the filter 308, and a lens 312. The lens 310 may be a shape-changing (e.g., varifocus, liquid varifocus) lens. A shape (and corresponding focus) of the lens 310 may be configured using an electrical signal (e.g., current) applied to an input of the lens 310. In an example, the lens 310 may be an Optotune EL-10-30-TC varifocus lens. Any suitable shape-changing lens may be used as the lens 310. The focal length (and corresponding working distance) of the architecture 301 may be configured based on the current applied to the lens 310. In some cases, the architecture 301 may include a lens 312, which may be optically coupled to the lens 310 and any suitable target (e.g., a target 340). The lens 312 may be configured to optically couple to any sample, surface, or object observed and/or otherwise analyzed using the autofocusing spectroscopy system. The lens 312 may be a plano convex lens configured to direct an optical signal on a target 340 of an autofocusing spectroscopy system configured with the architecture 301. In an example, the lens 312 may be a Thorlabs LA1289-A plano convex lens. Any suitable lens may be used as the lens 312. In some cases, the lens 312 may be configured to direct an optical signal (e.g., returned optical signal) returned from the target 340 onto the lens 310.

In some embodiments, the architecture 301 may include a filter 314, which may be optically coupled to the filter 308, a lens 316, and/or a mirror 318. The filter 314 may be a long-pass filter (e.g., a dichroic long-pass filter), which may propagate optical signals having greater than a threshold wavelength and may reflect optical signals having less than a threshold wavelength. In an example, the filter 314 may be a Semrock Di02-R514 dichroic long-pass filter. Any suitable filter may be used as the filter 314. The filter 314 may include one or more characteristics of the filter 308. In some cases, the architecture 301 may include a lens 316. The lens 316 may be optically coupled to the filter 314. The lens 316 may be a plano convex lens. Any suitable lens may be used as the lens 316. In an example, the lens 316 may be a Thorlabs LA1289-A plano convex lens. In some cases, the lens 316 may be optically coupled to an optical source 330, such that the lens 316 directs a received optical signal onto the filter 314.

In some embodiments, the architecture 301 may include a mirror 318. The mirror 318 may be optically coupled to the filter 314 and a lens 320. In an example, the mirror may be an Edmund Optics 36-041 mirror. Any suitable mirror may be used as the mirror 318. In some cases, the architecture 301 may include a lens 320. The lens 320 may be optically coupled to the mirror 318. In some cases, the lens 320 may be optically coupled to a photodiode 350 (or other suitable detector), where the photodiode 350 includes one or more characteristics of a photodiode as described herein. The lens 320 may be configured to direct a received optical signal on the photodiode 350. The lens 320 may be a plano convex lens. In an example, the lens 320 may be a Thorlabs LA1289-A lens. Any suitable lens may be used as the lens 320.

In some embodiments, the architecture 301 may be used in an autofocusing spectroscopy system to gather one or more spectroscopy measurements (e.g. laser spectroscopy measurements) of a target 340. The target 340 may be any surface, sample, or object that may be analyzed using spectroscopy (e.g., as described with respect FIG. 1A). In some cases, for spectroscopy measurements, the architecture 301 may include and/or otherwise be coupled to an optical source 330. The optical source 330 may include one or more characteristics of the optical source 130 and may be coupled (e.g., removably coupled) to the architecture 301 using a fiber cable and a coupling mechanism as described herein. In some cases, the architecture 301 may include and/or otherwise be coupled to a photodiode 350. As an example, the photodiode 350 may located external to the architecture 301 and may be optically coupled (e.g., removably coupled) to the architecture 301 using a fiber cable and a coupling mechanism as described herein. Examples of advantages for locating the photodiode 350 external to the architecture 301 may include reducing the size and weight of the respective autofocusing spectroscopy system, enabling further miniaturization of the system. The photodiode 350 may include one or more characteristics of the photodiode as described herein. In some cases, the architecture 301 may include and/or otherwise be coupled to a spectrometer 360. The architecture 301 may be coupled to the spectrometer 360 as described herein. The spectrometer 360 may include one or more characteristics of a spectrometer as described herein. If the spectrometer 360 is external to the architecture 301, the spectrometer 360 may be optically coupled (e.g., removably coupled) to the lens 302 via a fiber cable (or other optical cable) and a coupling mechanism (not shown in FIG. 3A).

In some embodiments, for a laser spectroscopy application of the architecture 301 as shown in FIG. 3A, the optical source 330 may emit an optical signal 381 (e.g., pulsed laser light at 515 nm) as shown in solid lines. The optical signal 381 may propagate through the lens 316 towards the filter 314. The filter 314 may reflect the optical signal 381 towards the filter 308 based on the optical signal 381 having wavelength less than a threshold wavelength. The filter 308 may reflect the optical signal 381 towards the lens 310 based on the optical signal 381 having wavelength less than a threshold wavelength.

In some embodiments, the optical signal 381 may reflect from the filter 308 towards the lens 310. As described herein, the lens 310 may be a shape changing (e.g., varifocus) lens, such that the focal length of the of the architecture 301 can be configured based on the configured shape of the lens 310. The optical signal 381 may propagate through the lens 310, such that the lens 310 focuses the optical signal 381 towards the lens 312. The optical signal 381 may propagate through the lens 312, such that the lens 312 focuses the optical signal 381 on a target 340. The optical signal 381 may illuminate the target 340. Based on the properties of the target 340, an optical signal 382 may return from the target 340 as shown in dashed lines in FIG. 3A. The optical signal 382 may be emitted, scattered, and/or luminesced from the target 340. The optical signal 382 may propagate towards the lens 312. The optical signal 382 may propagate through the lens 312 towards the lens 310. The optical signal 382 may propagate through the lens 310 towards the filter 308. The filter 308 may filter light included in the optical signal 382 that has less than a threshold wavelength, such that filter 308 reflects an optical signal 383 having less than a threshold wavelength towards the filter 314 and propagates an optical signal 385 having greater than the threshold wavelength towards the filter 306. In an example, the filter 308 may reflect Rayleigh scattering light originating from the optical signal 381 (e.g., having less than the threshold wavelength) interacting with the target 340, while propagating other light (e.g., having greater than the threshold wavelength). The Rayleigh scattering light may be measured by the photodiode 350 (for autofocusing of the architecture 301), while the other light may be measured by the spectrometer 360 for spectral analysis (and/or for autofocusing of the architecture 301). The filter 314 may filter light included in the optical signal 383 that has less than a threshold wavelength, such that filter 314 does not propagate an optical signal having less than a threshold wavelength and/or propagates an optical signal 384 having greater than the threshold wavelength (if applicable to the optical signal 382).

In some embodiments, if the filter 314 propagates an optical signal 384, the filter 314 may propagate the optical signal 384 towards a mirror 318. The mirror 318 may propagate the optical signal 384 towards the photodiode 350. In some cases, the lens 320 and the photodiode 350 may be separated by a divider, where the barrier includes a pinhole. The optical signal 384 may propagate through the pinhole to the photodiode 350. In some cases, the photodiode 350 may be included in the architecture 301 of an autofocusing spectroscopy system. In other cases, the photodiode 350 may be externally coupled (e.g., removably coupled) to the architecture 301 of an autofocusing spectroscopy system. The photodiode 350 may receive and/or otherwise measure the optical signal 384. In some cases, measurements of the power of the optical signal 384 collected by the photodiode 350 may be used to determine and configure a focus of an autofocusing spectroscopy system relative to the target 340. As described herein, for a range of configured focal lengths for the architecture 301 (e.g., as configured based on a current applied to the lens 310), the focal length (and corresponding working distance) resulting in the maximum power measured by the photodiode 350 may be the in focus configuration of the architecture 301 and the associated autofocusing spectroscopy system.

In some embodiments, the filter 308 may propagate an optical signal 385 towards the filter 306. The filter 306 may filter light included in the optical signal 385 that has less than a threshold wavelength, such that filter 306 does not propagate an optical signal having less than a threshold wavelength and/or propagates an optical signal 386 having greater than the threshold wavelength (if applicable to the optical signal 385). The filter may propagate the optical signal 386 towards the lens 304. The lens 304 may propagate the optical signal 386 towards the lens 302. The lens 302 may propagate the optical signal towards a spectrometer 360. In some cases, the spectrometer 360 may be included in the architecture 301 of an autofocusing spectroscopy system. In other cases, the spectrometer 360 may be externally coupled (e.g., removably coupled) to the architecture 301 of an autofocusing spectroscopy system. The spectrometer 360 may receive and/or otherwise measure the optical signal 386. In some cases, measurements of the power of the optical signal 386 collected by the spectrometer 360 may be used to determine and configure a focus of an autofocusing spectroscopy system relative to the target 340. As described herein, for a range of configured focal lengths for the architecture 301 (e.g., as configured based on a current applied to the lens 310), the focal length (and corresponding working distance) resulting in the maximum power measured by the spectrometer 360 may be the in focus configuration of the architecture 301 and the associated autofocusing spectroscopy system.

As shown in FIG. 3B, an exemplary autofocusing spectroscopy system 300 may include one or more components of the architecture 301 as described herein with respect to FIG. 3A. The autofocusing spectroscopy system 300 as shown in FIG. 3B may be used for spectroscopic applications when coupled to an optical source 330, a photodiode 350, and a spectrometer 360. As an example, the autofocusing spectroscopy system 300 may be used as a Raman probe, such that the system 300 can be used for Raman applications (e.g., chemical analysis of material(s) corresponding to a target). The autofocusing spectroscopy system 300 as shown in FIG. 3B may be used as a probe for LIBS applications based on a configuration of the filters 306, 308 and 314. For example, the filters 306, 308 and 314 may be configured as notch filters or dichroic notch filters, such that the filters 306, 308 and 314 do not propagate (e.g., reflect) optical signals having wavelengths corresponding to the optical signal 381, while propagating optical signals having wavelengths that are longer and/or shorter than the wavelengths corresponding to the optical signal 381.

In some embodiments, one or more additional or alternative components may be used in place of the one or more components described herein with respect to FIGS. 1A, 2A, and 3A. Table 1 as shown below describes similar or alternative components to those used in the architectures (101, 201, 301) of the autofocusing spectroscopy systems (100, 200, 300). These components may be used as replacement parts to modify the autofocusing spectroscopy systems (100, 200, 300) without modifying their respective functional capabilities.

TABLE 1

Exemplary Alternative Optical Components

| | |
|---|---|
| Shape Changing Lenses | Optotune (EL-3-10, EL-10-30-TC, EL-10-30-C, EL-10-42-OF, EL-16-40-TC) |
| | Corning (A-16F, A-25H, A-39N, A-58N, A-16F0-P-12, A-25H0-P-06, A-25H0-P-07, A-25H0-P-10, A-39N0-P-04, A-39N0-PW065) |
| Optical elements | Thorlabs (LA series), Edmund Optics (plano-convex series) |
| Mirror surfaces | Thorlabs (PF series), Edmund Optics (enhanced aluminum, protected silver series) |
| Optical filters | Semrock (Long-pass Edge series, Long-pass Dichroic Beamsplitter series) |

Embodiments of Methods for Autofocusing of Spectroscopy Systems

Each architecture (101, 201, 301) of a respective autofocusing spectroscopy system (100, 200, 300) may enable autofocusing on targets located at varying working distances from the system's optics. Each system's optics (e.g., shape changing lens) can be focused without the use of mechanical actuators (e.g., as in conventional autofocusing spectroscopy systems). Some non-limiting examples of mechanical actuators used to conventionally autofocus a spectroscopy system can include stepping motors, objective lens actuators, and piezo actuators. The autofocusing spectroscopy systems (100, 200, 300) may be configured to autofocus on target with varying topographical attributes (e.g., distances, structures, etc.) relative to the respective system, while maximizing a signal-to-noise ratio for system measurements. Each of the autofocusing spectroscopy systems (100, 200, 300) may be used as a remote probe for remote in-situ spectroscopy measurements, where each system can provide spectral analysis of a target (e.g., target 140, 240, or 340) in-situ and/or in a remote location. Such systems may enable autofocused spectroscopic analysis of targets without extracting the targets from their respective environments.

In some embodiments, a focal length (and corresponding working distance) of each autofocusing spectroscopy system (100, 200, 300) may be configured based a magnitude of an electrical signal (e.g., current) applied to each system's shape changing lens (e.g., lens 110, lens 212, or lens 310, respectively). As an example, to change the curvature of a lens 110 of the autofocusing spectroscopy system 100 to optimize a working distance between the system 100 and a target 140, a current applied to the lens 110 may be adjusted until the optimal working distance is attained. For a laser spectroscopy application as described with respect to FIGS. 1A, 2A, and 3A, an autofocusing spectroscopy system (100, 200, 300) may emit optical signals (e.g., pulsed laser light) towards a target. The optical signals may illuminate an area (e.g., spot) of the target, where the size of the area illuminated by the emitted optical signals may be correlated with the configured focal length of each respective system. A photodiode (or spectrometer) may measure the returned optical signal(s) (e.g., Rayleigh scattering light or other scattering light) corresponding to the illuminated area (e.g., the spot) of the target. Each autofocusing spectroscopy system may correlate the measured power of the illuminated area to a current applied to their respective shape changing lens (or lenses). To autofocus their respective optics, each autofocusing spectroscopy system may determine an applied current that results in a maximum measured power of the illuminated area by configuring one or more shapes for the shape changing lens and measuring the power of an optical signal returning from the illuminated area on the target. As described herein, one or more returned optical signals may be emitted, scattered, and/or luminesced from the target based on (e.g., in response to) the target being illuminated by an optical signal. After aggregating one or more measurements of the illuminated area of the target that each correspond to a current applied to a shape changing lens, a curve fit (e.g., a gaussian fit, polynomial fit, etc.) may be applied to the one or more measurements. A maximum (e.g., peak) power measurement of the illuminated area corresponding to a particular applied current configuration may be determined from the curve fit, which may be the in focus (i.e. optimized) configuration of the autofocusing spectroscopy system relative to the target.

Figure 4:
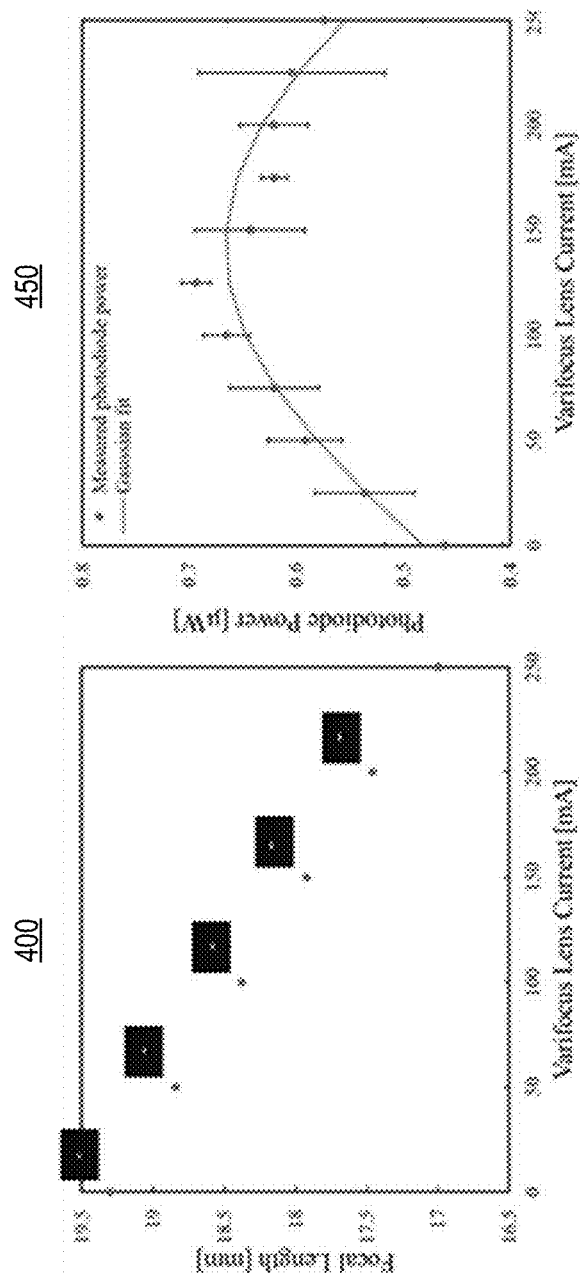
FIG. 4 shows exemplary charts of aggregated measurements as a function of an electrical signal applied to an autofocusing spectroscopy system, in accordance with some embodiments.

FIG. 4 shows exemplary charts of aggregated measurements as a function of an electrical signal applied to an autofocusing spectroscopy system, in accordance with some embodiments. As shown in a chart 400 in FIG. 4, a focal length ("Focal Length") of an autofocusing spectroscopy system may be configured as a function of a current applied to a shape changing lens ("Varifocus Lens Current"). The chart 400 shows a focal length of the autofocusing spectroscopy system decreasing (from approximately 19.25 mm to 17.5 mm) as the current applied to the shape changing lens is increased (from approximately 0 mA to 200 mA). The chart 400 also shows the illuminated area (e.g., spot size) corresponding to each configured lens current and focal length. As shown in a chart 450 in FIG. 4, a power ("Photodiode Power") corresponding to an illuminated area may be measured by a photodiode of an autofocusing spectroscopy system as a function of a current applied to a shape changing lens ("Varifocus Lens Current"). A Gaussian fit (or another fit) can be applied to the current and power measurements as shown in the chart 450. The chart 400 shows a relationship between power measured by the photodiode and the current applied to the shape changing lens. The chart 450 shows the peak measured power of approximately 0.7 µW at an applied current of approximately 125 mA. Further, based on the Gaussian fit applied to the measurements in the chart 450, the peak photodiode power can be measured (and optimal focus may be attained) when the applied current is configured to approximately 140 mA.

Figure 5:
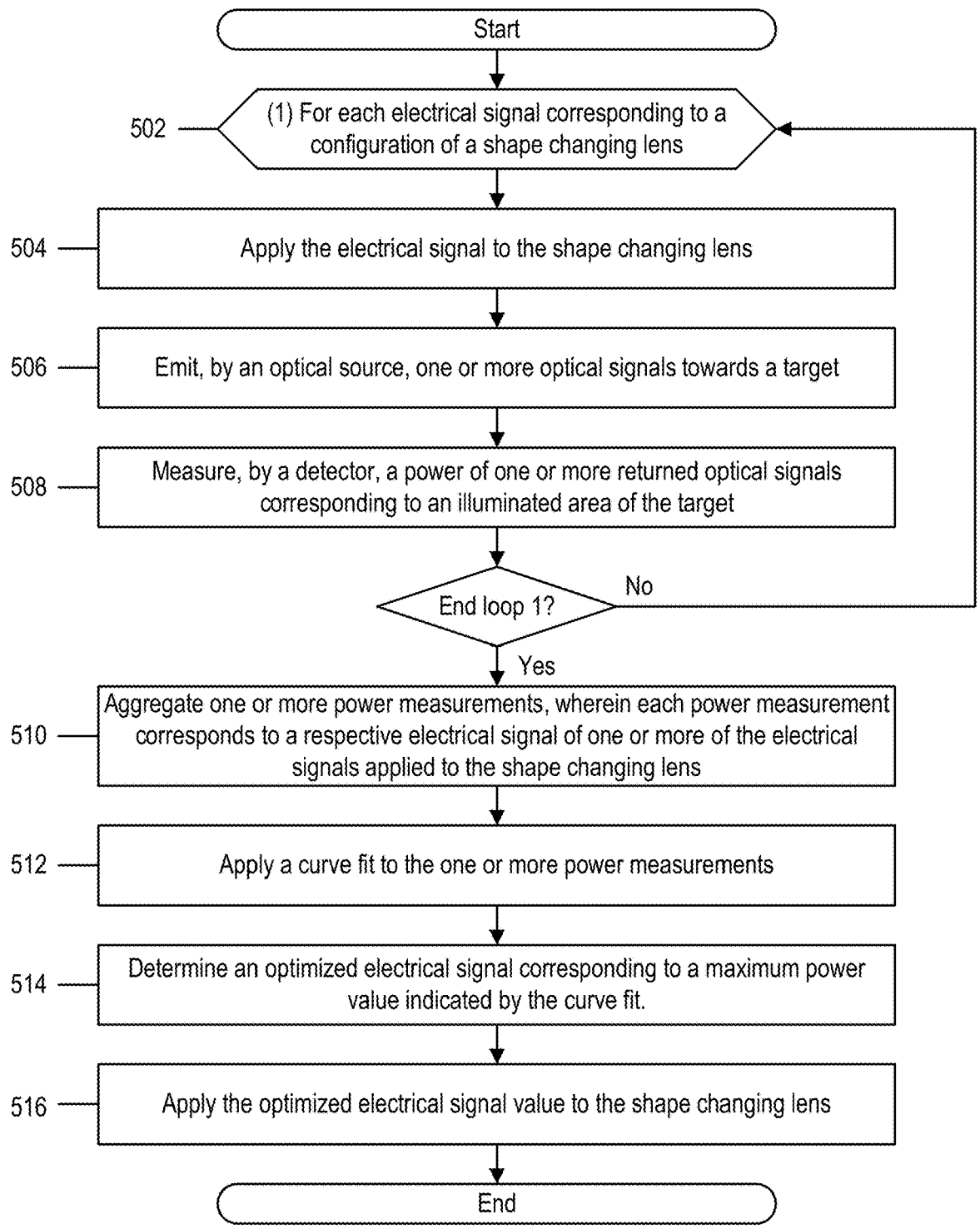
FIG. 5 shows a flowchart of an exemplary method for autofocusing a spectroscopy system on a target, in accordance with some embodiments.

FIG. 5 shows a flowchart of an exemplary method 500 for autofocusing a spectroscopy system on a target, in accordance with some embodiments. The autofocusing method 500 may be suitable for autofocusing a spectroscopy system's optics on a target. As indicated by the loop header 502, steps 504, 506, and 508 of the method 500 may be performed for each electrical signal (e.g., current) applied to a shape changing lens of an autofocusing spectroscopy system. For simplicity, the following paragraphs describe steps 504, 506, and 508 with reference to a single applied current. However, one of ordinary skill in the art will appreciate that steps 504, 506, and 508 each may be performed for each current applied to the shape changing lens (e.g., to reconfigure the lens' shape and the system's focal length). One or more computing devices (e.g., controllers) may control the autofocusing spectroscopy system during execution of the method 500. The one or more computing devices may be included in and/or external to the architecture of a respective autofocusing spectroscopy system. As an example, a first controller may control an optical source, a second controller may control a photodiode, a third controller may control a spectrometer, and a fourth controller may control an electrical signal applied to a shape changing lens. As another example, a controller may control each of the optical source, the photodiode, the spectrometer, and the electrical signal applied to the shape changing lens.

To autofocus on a respective target subject to a laser spectroscopy application, for each (or any) electrical signal (e.g., current) corresponding to a configuration of a shape changing lens of an autofocusing spectroscopy system, the autofocusing spectroscopy system may (1) apply the electrical signal (e.g., current) to the shape changing lens; for each electrical signal applied to the shape changing lens, (2) emit, by an optical source, one or more optical signals towards a target; for each electrical signal applied to the shape changing lens, (3) measure, by a detector, a power of returned optical signals corresponding to an illuminated area (e.g., spot) of the target; (4) aggregate one or more power measurements from the detector, wherein each power measurement corresponds to a respective electrical signal of the one or more of electrical signals applied to the shape changing lens; (5) apply a curve fit to the one or more power measurements and the corresponding electrical signals; (6) determine an optimized electrical signal from a range of electrical signals corresponding to the one or more power measurements based on a maximum power value indicated by the curve fit; and (7) apply the optimized electrical signal to the shape changing lens.

At step 504, the autofocusing spectroscopy system may apply a current to a shape changing lens. The current may be any one of a range of currents that correspond to different shapes of the shape changing lens, where the loop 502 may iterate for each configured current of the range of currents. The autofocusing spectroscopy system may be any one of (or combination of) the autofocusing spectroscopy systems (100, 200, 300) and architectures (101, 201, 301) described herein with respect to FIGS. 1A-1B, 2A-2B, and 3A-3B, as well as any other suitable autofocusing spectroscopy system. The shape changing lens may be any one of the lens 110, lens 212, or lens 310, as well as any other suitable shape changing lens. As an example, a current applied to a shape changing lens may be in the range of 0-300 mA, but any suitable current may be applied based on the configuration of the shape changing lens. When a current is input/applied to a shape changing lens, a shape of the lens may change (e.g., deform), resulting in a change to a focal length of the respective autofocusing spectroscopy system. In some cases, the shape changing lens may include a membrane, which may change shape and/or otherwise deform based on a magnitude of a current applied to the lens. A change in curvature of the membrane due to a change in an applied current can result in a change in a focal point of the autofocusing spectroscopy system, enabling calibration between an applied current and a focal position of a target.

At step 506, an optical source included in and/or coupled to the autofocusing spectroscopy system may emit one or more optical signals towards a target. In some cases, the optical source may be a laser as described herein. The emission of the one or more optical signals may be used for spectroscopic analysis of a target. The optical signal(s) may be pulsed laser light at 515 nm as described herein. The optical source may be optically coupled to an architecture (101, 201, 301) of the respective autofocusing spectroscopy system, such that the architecture receives the optical signal(s) and directs the optical signal(s) to the target. Directing the optical signal(s) to the target may illuminate an area (e.g., spot) on the target. A size and/or an intensity of the illuminated area on the target may correspond to the focus of the autofocusing spectroscopy system relative to the target. One or more returned optical signals may be emitted, scattered, and/or luminesced from the illuminated area of the target. In an example, returned optical signals may propagate back through the autofocusing spectroscopy system.

At step 508, the autofocusing spectroscopy system may measure, by a detector, a power of one or more returned optical signals corresponding to an illuminated area of the target. The detector may be a photodetector, a spectrometer, and/or any other suitable detector as described herein. The returned optical signal(s) may emit, scatter, and/or luminesce from the target and may propagate back through the autofocusing spectroscopy system. In an example, if the detector is a photodiode, the photodiode may detect Rayleigh scattering light included in the returned optical signal(s). In another example, if the detector is a spectrometer, the spectrometer may detect other (e.g., non-Rayleigh) light included in the returned optical signal(s). The autofocusing spectroscopy system may correlate the measured power of returned optical signal(s) with the magnitude of the current applied to the shape changing lens. The autofocusing spectroscopy system may store an indication of the current and resulting measured power. In some cases, the autofocusing spectroscopy system may determine its respective focal length based on the curvature of the shape changing lens (e.g., as configured by the applied current).

At step 510, the autofocusing spectroscopy system may aggregate one or more power measurements corresponding to the respective currents applied to the shape changing lens. The autofocusing spectroscopy system may aggregate each of the power measurements collected at step 508, where each power measurement includes a magnitude of a current applied to a shape changing lens (e.g., as applied in step 504) and the resulting power measured by a detector (e.g., as measured in step 508). In some cases, each power measurement may include a focal length of the autofocusing spectroscopy system determined based on the shape of the shape changing lens.

At step 512, the autofocusing spectroscopy system may graph the one or more power measurements as a function of the corresponding applied currents and may apply a curve fit to the one or more power measurements. The curve fit may be a polynomial fit, a Gaussian fit, and/or any other suitable line/curve fit. In some cases, the curve fit may include a maximum power value corresponding to a current value within the range of currents applied to the shape changing lens. As an example, for applied currents ranging from 0-250 mA, a maximum power value indicated by the curve fit may be present at approximately 140 mA.

At step 514, the autofocusing spectroscopy system may determine an optimized current value corresponding to a maximum power value indicated by the curve fit. An example of a curve fit with a maximum power is described herein with respect to chart 450 and FIG. 4. The maximum power value indicated by the curve fit may correspond the range of currents applied to the shape changing lens. In some cases, the optimized current value indicated by the curve fit may only be selected from the range of currents applied to the shape changing lens. As an example, for applied currents ranging from 0-250 mA, a maximum power value indicated by the curve fit may correspond to a 300 mA current, which may not be selected by the autofocusing spectroscopy system as the optimized current value. The optimized current value may correspond to a shape of the shape changing lens that optimizes the autofocusing spectroscopy system's focal length (and corresponding working distance) relative to the target.

At step 516, the autofocusing spectroscopy system may apply an optimized current that corresponds to the optimized current value to the shape changing lens. Applying the optimized current to the shape changing lens may adjust the focal length of the autofocusing spectroscopy system such that the system is focused on the target to collect focused spectroscopic measurements of the target. The autofocusing spectroscopy system may be configured with an in focus configuration based on applying the optimized current to the shape changing lens. Based on being focused on the target, the autofocusing spectroscopy system may collect one or more optical signals for spectroscopic analysis of the respective target.

In some embodiments, the method 500 may be rapidly and/or continuously executed, such that the autofocusing spectroscopy system may be consistently focused on the target. The method 500 may be executed as the autofocusing spectroscopy system and/or the target changes position, such that focused spectroscopic measurements may be consistently gathered. The method 500 may be performed by the autofocusing spectroscopy system. In some embodiments, a system that includes and/or is otherwise coupled to the autofocusing spectroscopy system may communicate with a control module within the autofocusing spectroscopy system (e.g., a program resident in a computer-readable storage medium within the autofocusing spectroscopy system and executed by a processor within the autofocusing spectroscopy system) to perform any/all of the steps 502-516 as described above.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having the same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A spectroscopic autofocusing method comprising:
applying a plurality of electrical signals to a shape changing lens of a spectroscopy system;
emitting, by an optical source coupled to the spectroscopy system, one or more optical signals directed to a target;
determining, by a detector, one or more power measurements of one or more returned optical signals corresponding to an illuminated area of the target;
aggregating, from the detector, the one or more power measurements, wherein each power measurement is a function of a respective electrical signal of the plurality of electrical signals applied to the shape changing lens; and
determining an optimized electrical signal corresponding to a maximum power measurement based on a curve fit between the one or more power measurements and current values of the electrical signals applied to the shape changing lens.

2. The method of claim 1, wherein a shape of the shape changing lens changes as a function of the electrical signal applied to the shape changing lens.

3. The method of claim 2, wherein the shape comprises a curvature.

4. The method of claim 2, wherein a focal length of the spectroscopy system changes as a function of the shape of the shape changing lens.

5. The method of claim 1, wherein the optical source comprises a laser.

6. The method of claim 1, wherein the spectroscopy system comprises the optical source.

7. The method of claim 1, wherein the optical source is externally coupled to the spectroscopy system.

8. The method of claim 1, wherein the optical signals comprise pulsed light.

9. The method of claim 1, wherein the optical signals comprise continuous light.

10. The method of claim 1, wherein the spectroscopy system comprises the detector.

11. The method of claim 1, wherein the detector is externally coupled to the spectroscopy system.

12. The method of claim 1, wherein the detector comprises a photodiode or a spectrometer.

13. The method of claim 1, further comprising:
capturing one or more images of the target using one or more cameras subject to the one or more optical signals directed to the target;
processing the one or more images to determine three-dimensional topographical information and distance information; and
determining an optimized configuration of the shape changing lens for focusing the spectroscopy system on the target.

14. The method of claim 1, wherein the one or more returned optical signals are at least one of emitted, scattered, and luminesced from the target.

15. The method of claim 1, wherein determining an optimized electrical signal corresponding to a maximum power measurement further comprises:
determining the curve fit for the one or more power measurements as the function of the plurality of electrical signals applied to the shape changing lens;
determining the maximum power measurement indicated by the curve fit within a range of electrical signals corresponding to the plurality of electrical signals; and
determining the optimized electrical signal corresponding to the maximum power measurement indicated by the curve fit.

16. The method of claim 15, wherein the curve fit comprises a Gaussian fit or a polynomial fit.

17. The method of claim 1, further comprising:
applying the optimized electrical signal to the shape changing lens to focus the spectroscopy system on the target.

18. The method of claim 1, further comprising:
measuring, by a spectrometer, the one or more returned signals; and
analyzing one or more spectral properties of the target based on the one or more returned signals.

19. The method of claim 18, wherein the spectrometer is externally coupled to the spectroscopy system.

20. A spectroscopy system comprising:
an optical source configured to emit one or more optical signals directed to a target;
a shape changing lens coupled to a controller, wherein the shape changing lens is configured to optically couple to the optical source and the target; and
a detector coupled to the controller, wherein the detector is configured to optically couple to the shape changing lens and determine one or more power measurements of one or more returned optical signals corresponding to an illuminated area of the target,
wherein the controller is configured to:
apply a plurality of electrical signals to the shape changing lens,
aggregate the one or more power measurements, wherein each power measurement is a function of a respective electrical signal of the plurality of electrical signals applied to the shape changing lens, and
determine an optimized electrical signal corresponding to a maximum power measurement based on a curve fit between the one or more power measurements and current values of the electrical signals applied to the shape changing lens.

21. The system of claim 20, wherein a shape of the shape changing lens changes as a function of the electrical signal applied to the shape changing lens.

22. The system of claim 21, wherein the shape comprises a curvature.

23. The system of claim 21, wherein a working distance relative to the target changes as a function of the shape of the shape changing lens.

24. The system of claim 20, wherein the optical source comprises a laser.

25. The system of claim 20, wherein the optical source is configured to removably couple to the spectroscopy system.

26. The system of claim 20, wherein the optical signals comprise pulsed light.

27. The system of claim 20, wherein the optical signals comprise continuous light.

28. The system of claim 20, wherein the detector is configured to removably couple to the spectroscopy system.

29. The system of claim 20, wherein the detector comprises a photodiode or a spectrometer.

30. The system of claim 20, wherein the controller configured to:
receive one or more images of the target captured by one or more cameras subject to the one or more optical signals directed to the target;
process the one or more images to determine three-dimensional topographical information and distance information; and
determine an optimized configuration of the shape changing lens for focusing the spectroscopy system on the target.

31. The system of claim 20, wherein the one or more returned optical signals are at least one of emitted, scattered, and luminesced from the target.

32. The system of claim 20, wherein the controller being configured to determine an optimized electrical signal corresponding to a maximum power measurement further comprises the controller being configured to:
determine the curve fit for the one or more power measurements as the function of the plurality of electrical signals applied to the shape changing lens;
determine the maximum power measurement indicated by the curve fit within a range of electrical signals corresponding to the plurality of electrical signals; and
determine the optimized electrical signal corresponding to the maximum power measurement indicated by the curve fit.

33. The system of claim 32, wherein the curve fit comprises a Gaussian fit or a polynomial fit.

34. The system of claim 20, wherein the controller is configured to apply the optimized electrical signal to the shape changing lens to focus the spectroscopy system on the target.

35. The system of claim 20, further comprising a spectrometer, wherein the spectrometer is coupled to the controller and is configured to:
measure the one or more returned signals, and
analyze one or more spectral properties of the target based on the one or more returned signals.

36. The system of claim 35, wherein the spectrometer is configured to removably couple to the spectroscopy system.

* * * * *